United States Patent
Jeong et al.

(10) Patent No.: US 9,210,380 B2
(45) Date of Patent: *Dec. 8, 2015

(54) MULTI-PARTICIPANT CONFERENCE SETUP

(71) Applicant: Apple Inc., Cupertino, CA (US)

(72) Inventors: Hyeonkuk Jeong, San Jose, CA (US); Joe Abuan, Milipitas, CA (US); Jim Normile, Los Altos, CA (US); Ryan Salsbury, Cupertino, CA (US); Berkat Shing Tung, Sacramento, CA (US)

(73) Assignee: APPLE INC., Cupertino, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/062,298

(22) Filed: Oct. 24, 2013

(65) Prior Publication Data

US 2014/0049599 A1    Feb. 20, 2014

Related U.S. Application Data

(63) Continuation of application No. 13/543,733, filed on Jul. 6, 2012, now Pat. No. 8,594,293, which is a continuation of application No. 13/011,848, filed on Jan. 21, 2011, now Pat. No. 8,243,905, which is a continuation of application No. 11/118,931, filed on Apr. 28, 2005, now Pat. No. 7,899,170.

(51) Int. Cl.
*H04N 7/14* (2006.01)
*H04N 7/15* (2006.01)
*H04Q 3/00* (2006.01)

(52) U.S. Cl.
CPC ............ *H04N 7/152* (2013.01); *H04Q 3/0045* (2013.01); *H04Q 2213/1324* (2013.01); *H04Q 2213/13093* (2013.01); *H04Q 2213/13332* (2013.01)

(58) Field of Classification Search
CPC ..... G06F 3/0481; G06F 3/1462; H04L 65/60; G06Q 10/10
USPC .......................................... 370/261; 709/204
See application file for complete search history.

(56) References Cited

U.S. PATENT DOCUMENTS

| | | | | |
|---|---|---|---|---|
| 7,124,164 | B1 * | 10/2006 | Chemtob | 709/204 |
| 7,525,923 | B2 * | 4/2009 | Matta | 370/252 |
| 8,103,753 | B2 * | 1/2012 | Taylor et al. | 709/222 |
| 8,929,530 | B1 * | 1/2015 | Webster et al. | 379/202.01 |
| 2004/0028200 | A1 * | 2/2004 | Carlson | 379/201.01 |
| 2006/0153076 | A1 * | 7/2006 | Bradd | 370/230 |
| 2013/0132862 | A1 * | 5/2013 | Noel et al. | 715/753 |

* cited by examiner

*Primary Examiner* — Creighton Smith
(74) *Attorney, Agent, or Firm* — Fay Kaplun & Marcin, LLP

(57) ABSTRACT

Some embodiments provide an architecture for establishing a multi-participant conference. This architecture has one participant's computer in the conference act as a central content distributor for the conference. The central distributor receives data (e.g., video and/or audio streams) from the computer of each other participant, and distributes the received data to the computers of all participants. In some embodiments, the central distributor receives A/V data from the computers of the other participants. From such received data, the central distributor of some embodiments generates composite data (e.g., composite image data and/or composite audio data) that the central distributor distributes back to the participants.

20 Claims, 21 Drawing Sheets

MULTI-PARTICIPANT CONFERENCE SETUP

This application is a continuation of U.S. patent application Ser. No. 13/543,733, filed Jul. 6, 2012, which is a continuation of U.S. patent application Ser. No. 13/011,848, filed Jan. 21, 2011, now issued as U.S. Pat. No. 8,243,905, which is a continuation of U.S. patent application Ser. No. 11/118,931, filed Apr. 28, 2005, now issued as U.S. Pat. No. 7,899,170, whose disclosures are incorporated herein by reference as if set forth in their entirety.

BACKGROUND

In recent years, users of local and wide area networks (e.g., the Internet) have upgraded to increasingly higher bandwidth connections. The common user also has access to greater computer hardware processing power. At the same time, the coders and decoders (codecs) for video transmission over a network connection have seen improvements such that an individual user has the capability to stream and receive real-time video over the Internet with off-the-shelf components. All this has allowed individual users to begin chatting, sharing, and videoconferencing with point-to-point technologies on their computers.

However, bandwidth remains a constrained resource that must be shared over many users. Likewise, processing power is typically shared by the operating system and several applications in a typical user's computer hardware. These factors have been barriers to the use of personal computers in establishing a conference with more than two participants. Such a conference will be referenced below as a multi-participant conference.

Several approaches are possible for multi-participant conferencing. One such approach is the full-mesh topology, which is the extension of two-participant point-to-point methods to multi-participant conferencing. Under the full-mesh topology, each participant sends all of its audio and/or video (A/V) data to all other participants in the multi-participant conference. However, the full mesh topology requires a high amount of processing power and broad bandwidth at and between each participant of the multi-participant conference. Even with just a few participants, the full-mesh topology quickly becomes untenable because each participant and each network connection is responsible for sending and receiving a burdensome amount of data. Moreover, the weakest connection or hardware point determines the maximum capability of a conference for all participants in the full-mesh topology.

The star topology is another possible approach for multi-participant conferencing. In prior art this approach uses a central server to receive data from all participants in the conference and send all that data back out to each participant. The required server needs high bandwidth and processing power. The server requirements scale with the number of conferences to be hosted, making this approach unusable for wide scale deployment.

Thus, there is a need in the art for a better architecture for multi-participant conferencing. Ideally, such an architecture would allow the participants to use off-the-shelf computers and typically available bandwidth and not require the deployment of dedicated servers.

SUMMARY OF THE INVENTION

Some embodiments provide an architecture for establishing a multi-participant conference. This architecture has one participant's computer in the conference act as a central content distributor for the conference. The central distributor receives data (e.g., video and/or audio streams) from the computer of each other participant, and distributes the received data to the computers of all participants.

In some embodiments, the central distributor receives A/V data from the computers of the other participants. From such received data, the central distributor of some embodiments generates composite data (e.g., composite image data and/or composite audio data) that the central distributor distributes back to the participants.

The central distributor in some embodiments can implement a heterogeneous audio/video conference. In such a conference, different participants can participate in the conference differently. For instance, different participants might use different audio or video codecs. Moreover, in some embodiments, one participant might participate in only the audio aspect of the conference, while another participant might participate in both audio and video aspects of the conference.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide an architecture for establishing a multi-participant conference. This architecture has one participant's computer in the conference act as a central content distributor for the conference. In some embodiments, the central distributor is a participant that meets certain criteria. The criteria of some embodiments may include whether the participant has sufficient bandwidth and processing power. The central distributor is also referred to below as a focus point computer or focus computer for the multi-participant video conference. The computers of the other participants will be referred to below as non-focus computers.

The central distributor receives data (e.g., video and/or audio streams) from the computer of each other participant, and distributes the received data to the computers of all participants. In some embodiments, the central distributor (1) receives A/V data from the computers of the other participants, and from such data, (2) generates composite data (e.g., composite image data and/or composite audio data) that it distributes back to the participants.

The central distributor in some embodiments can implement a heterogeneous audio/video conference. In such a conference, different participants can participate in the conference differently. For instance, different participants might use different audio or video codecs. Moreover, in some embodiments, one participant might participate in only the audio aspect of the conference, while another participant might participate in both audio and video aspects of the conference.

I. Focus Point Architecture

Figure 1:
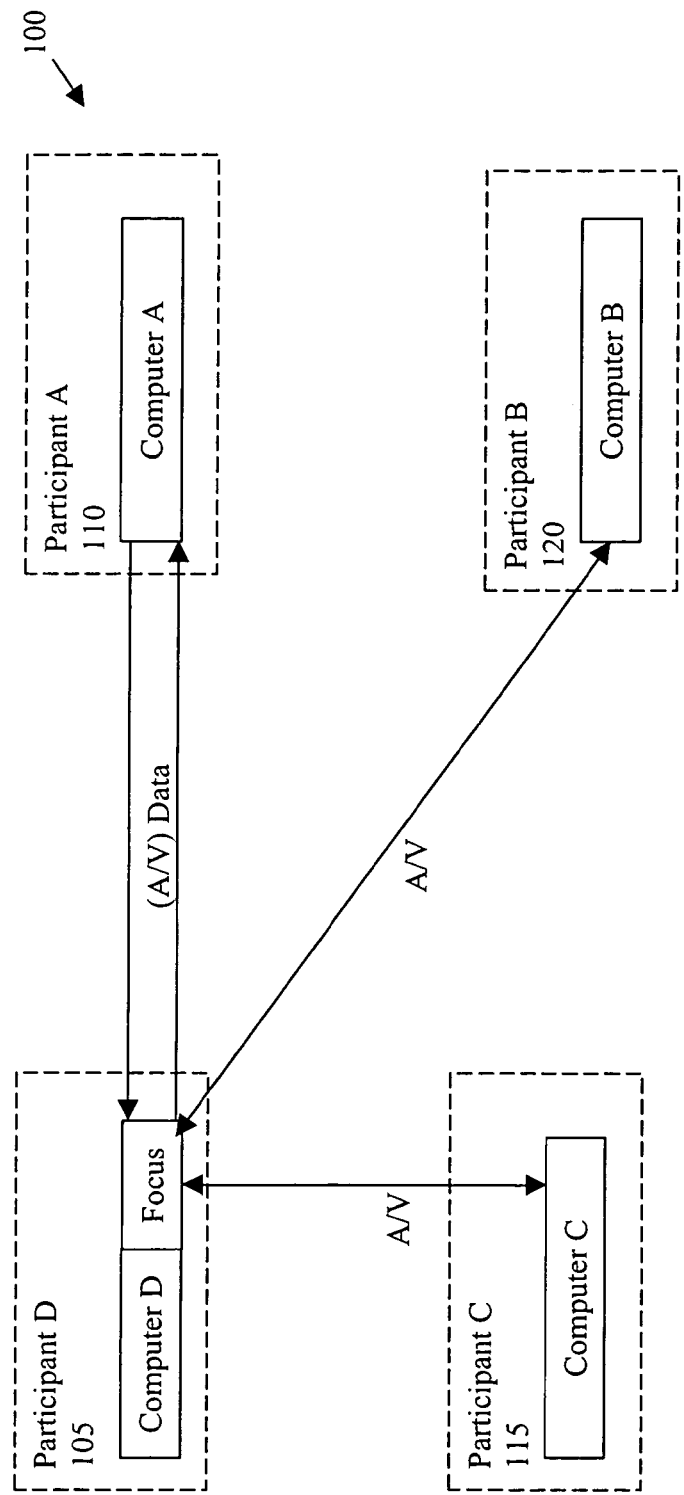
FIG. 1 illustrates a multi-participant focus-point conference.

FIG. 1 illustrates an example of a conference architecture 100 of some embodiments of the invention. This architecture allows multiple participants to engage in a conference. In the example illustrated in FIG. 1, four participants A, B, C, and D are engaged in a conference through their four computers 105-120.

The architecture 100 has participant D's computer 105 serve as a focus point computer and the computers 110, 115, and 120 of the other participants A, B, and C serve as non-focus computers. During the conference, each non-focus computer 110, 115, and 120 connects to the focus point 105 through a network (not shown). The network can be any network, such as a local area network, a wide area network, a network of networks (i.e., the Internet), etc. The network allows conference data to pass between the focus computer 105 and the non-focus computers 110, 115, and 120. As shown FIG. 1, the non-focus computers 110, 115, and 120 do not pass conference data directly to each other in the focus-point architecture 100.

During the conference, the focus point computer 105 serves as the central distributor of audio/video content to the other computers. As the central distributor of audio/video content, the focus computer 105 receives A/V data from each participant, composites and encodes the received data, and then transmits the composite data to each of the non-focus computers.

In some embodiments, the focus point computer removes a particular non-focus participant's data from the composite data that the focus point computer transmits to the particular non-focus participant. Also, in some embodiments, the focus point computer embeds relative audio strength values in the composite audio data to facilitate the use of audio level meters and audio panning at the non-focus computers. Such audio and video compositing are further described in U.S. patent application Ser. No. 11/118,555 entitled "Audio Processing in a Multi-Participant Conference", issued as U.S. Pat. No. 7,864,209, filed concurrently with this application, and in U.S. patent application Ser. No. 11/118,553 entitled "Video Processing in a Multi-Participant Video Conference", issued as U.S. Pat. No. 7,817,180, filed concurrently with this application. Both these applications are incorporated herein by reference.

Some embodiments are implemented by an A/V conference application (e.g., iChat® provided by Apple Computer, Inc.) that allows a computer to act as a focus computer or a non-focus computer in a multi participant conference. As such, during an A/V conference, the conferencing application receives, composites, and distributes A/V content when serving as a focus computer. However, one of ordinary skill will realize that other embodiments may implement the receiving, compositing, and distribution as one or more separate modules.

In some embodiments, a focus point computer sets up a multi-participant conference by inviting two or more participants to join the conference. Before a computer can act as a focus point computer that is capable of inviting multiple participants to a multi-participant conference, the computer must first be designated as a focus point capable computer. The next section (Section II) describes how some embodiments designate a computer as focus point capable. Section II also describes how a focus point computer invites participants to set up a multi-participant conference. Section III describes messaging over Session Initiation Protocol and encryption. Section IV describes the operations of focus and non-focus computers once a multi-participant conference is underway. Section V describes heterogeneous multi-participant conferencing.

II. Setting Up a Conference

A. Focus-Point Assessment Process

As mentioned above, some embodiments are implemented by an A/V conferencing application that allows a computer to act as a focus or non-focus computer in a multi participant conference. When the conferencing application of some embodiments starts on a particular computer, the application performs a focus-point assessment process to determine whether the particular computer can serve as a focus point for a multi-participant conference.

Figure 2:
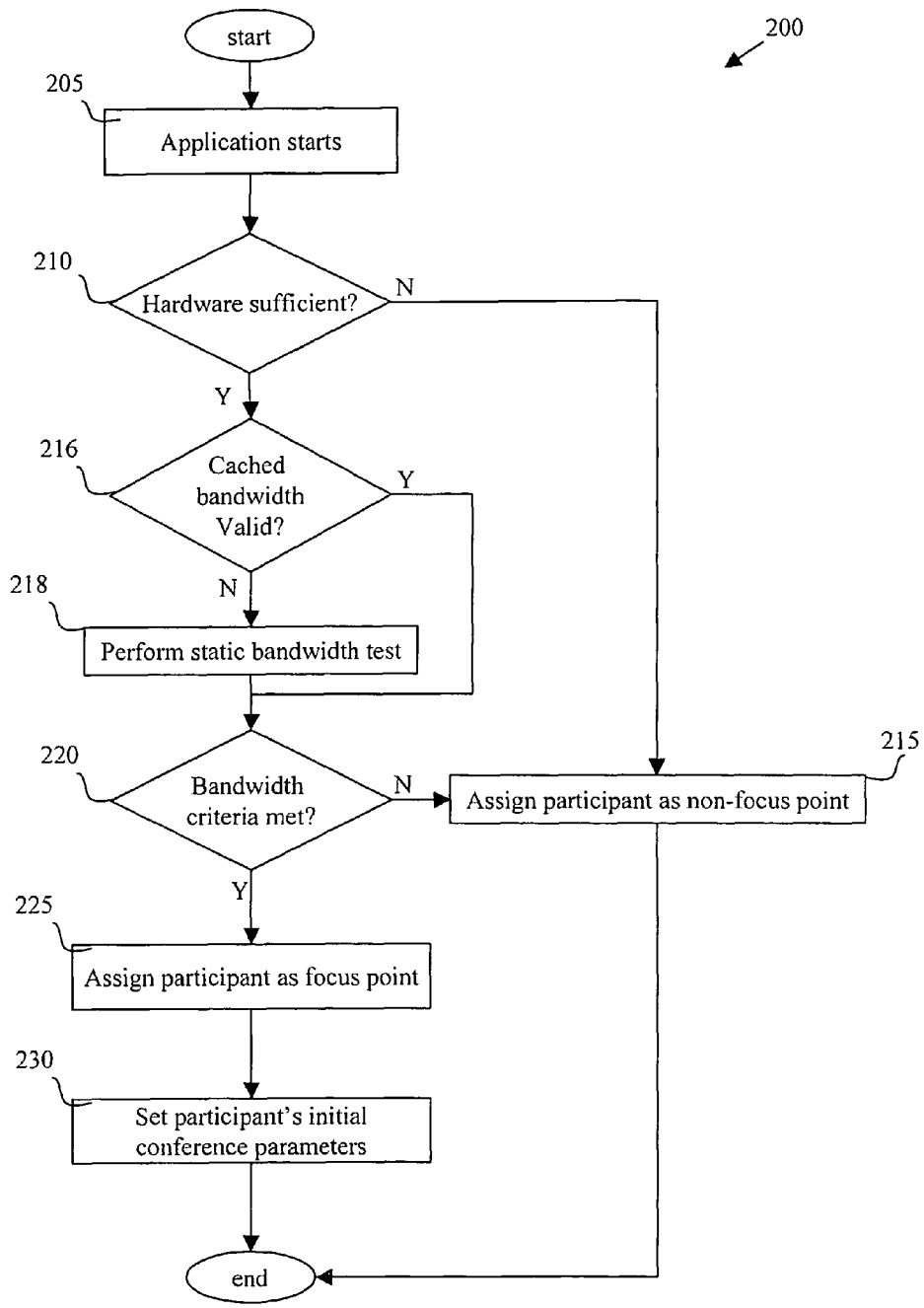
FIG. 2 illustrates a focus point assessment process according to some embodiments of the invention.

FIG. 2 illustrates an example of such a focus-point assessment process 200 of some embodiments. As shown in this figure, this process 200 starts (at 205) each time that the conferencing application starts. Next, at 210 the process performs an inspection of the participant's computer. To aid in the determination of whether a computer can be a focus point, and to provide additional constraints in the default static conference capabilities of a computer, some embodiments perform a local hardware inspection at 210 of the focus-point assessment process 200. If, at 210, the local hardware determination does not meet the criteria for a focus point, then the focus-point assessment process 200 transitions to 215 where the computer is designated as non-focus point capable.

If the hardware determination does meet the criteria for a focus point, then the focus point assessment process 200 proceeds to 216 where the process begins a determination of whether the computer has sufficient bandwidth to act as a focus point computer. At 216, some embodiments first determine whether a static bandwidth test is required. In these embodiments, the results of prior static bandwidth tests are stored to non-volatile memory (i.e., cached). These embodiments check whether the cached bandwidth values are still valid. If the cached bandwidth values are still valid, the process 200 forgoes the static bandwidth test described below (at 218) and instead uses the cached values to determine whether the bandwidth criteria for a focus computer is met (at 220). The cached values of these embodiments also determine the default conferencing capabilities of the computer.

If, at 216, the cached values are no longer valid, then the focus-point assessment process performs a new or initial static bandwidth test (at 218) to determine whether the conferencing application's computer meets the bandwidth criteria for acting as a focus point. As further described below, the results of this initial test are cached in some embodiments and used to set the default conferencing capabilities of the computer.

Figure 3:
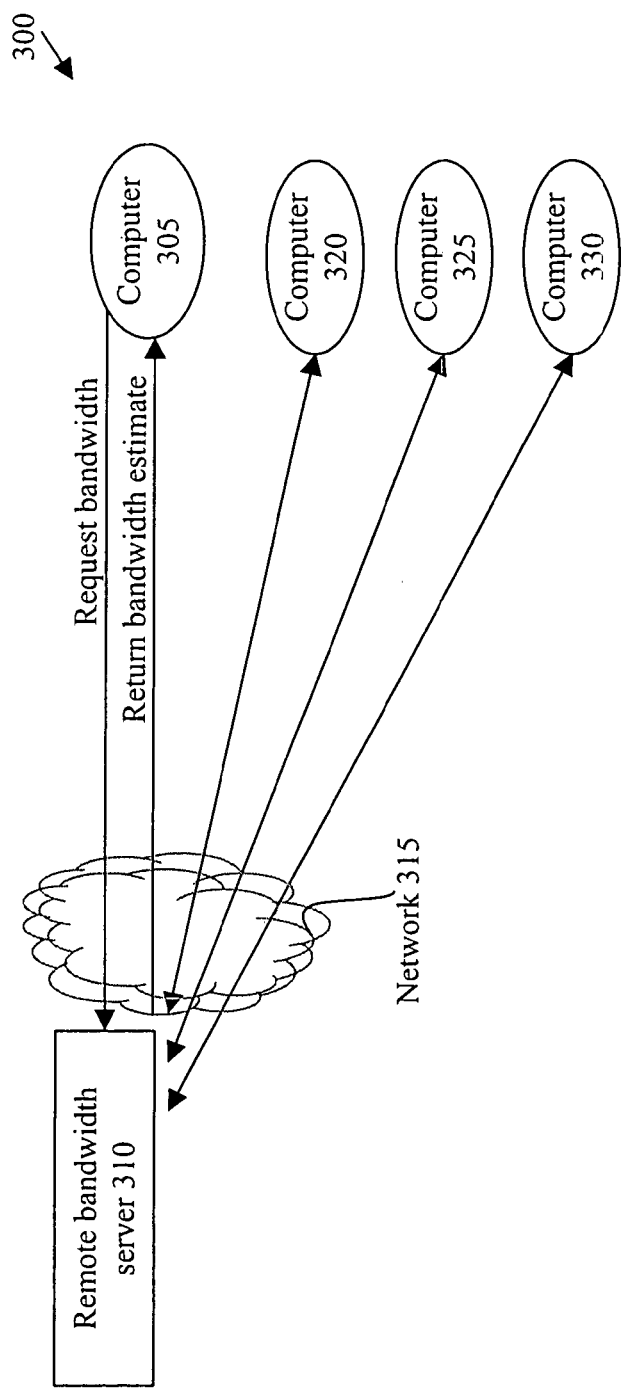
FIG. 3 illustrates participants performing static bandwidth estimation with a remote server.

To perform the initial static bandwidth test at 218, some embodiments employ a server (e.g., the ".mac"® server provided by Apple Computer, Inc.) that is located at a remote location from the conferencing application's computer. FIG. 3 illustrates a conferencing application's computer 305 performing an initial static bandwidth test with a remote bandwidth server 310 through a network 315 (e.g., through the Internet). As shown in this figure, the initial static bandwidth test involves the computer 305 sending a request to the server 310 for an assessment of the network bandwidth available to the computer 305. In response, the server 310 sends and receives packets from the computer 305 to assess its available bandwidth. Once the server 310 has completed its assessment of the computers available bandwidth, it provides the computer with an estimate of its bandwidth, as shown in FIG. 3. As further shown in FIG. 3, the bandwidth server 310 receives bandwidth determination requests from other computers.

Due to the number of requests at a given time, or for a variety of other reasons (e.g., network congestion, downtime, etc.), the bandwidth server 310 may not be available to respond to a particular request by the focus-point assessment process 200. For the cases when the bandwidth server is unavailable, the conferencing application of some embodiments caches (i.e., retains in non-volatile memory) the last successful static bandwidth estimate.

Regardless of whether the bandwidth estimate is newly performed (218) or is cached (216), the focus-point assessment process 200 then applies (at 220) the bandwidth estimate to a set of rules that determine whether the computer can be a focus point. If the initial static bandwidth estimate does not meet (at 220) the criteria for a focus point, then the process 200 transitions to 215. At 215, the computer is designated as non-focus point capable and then the focus-point assessment process 200 terminates. If the initial static bandwidth estimate is deemed sufficient (at 220) to meet the focus point bandwidth criteria, the process 200 transitions to 225 and the participant is designated as focus point capable. A focus capable computer may act as either a focus computer or a non-focus computer, and may host or join both peer-to-peer and multi-participant conferences. A non-focus computer, however, may host only a peer-to-peer conference, but may join both peer-to-peer and multi-participant conferences.

At 230, the focus-point assessment process 200 applies the initial bandwidth estimate to a set of rules to define the default conferencing capability (i.e., defines a set of default conference parameters) for the computer to potentially use in the next conference the computer initiates or joins. For instance, some embodiments utilize sets of rules for the cases where the computer is (1) a participant in a peer-to-peer conference, (2) a client (i.e., a non-focus computer) in a multi-participant conference, or (3) a focus point in a multi-participant conference. Tables 1-3 below illustrate examples of such rules for some embodiments. These tables illustrate examples where the initial estimated bandwidth determines the default frame rate and frame size for the focus point and non-focus point computers' encoders. These tables also show that the rules vary depending upon whether the participant acts as a focus point or a client, and whether the conference is peer-to-peer or multi-participant.

TABLE 1

Either Participant in Peer-to-Peer Conference

| bandwidth (bps) | frame rate | frame size (H.263/H.264) |
|---|---|---|
| >1.0M | 30fps | 352 × 288/640 × 480 |
| 500K-1.0M | 30fps | 352 × 288/320 × 240 |
| <500K | 15fps | 176 × 144/160 × 120 |

TABLE 2

Client (Non-Focus Computer) in Multi-Participant Conference

| bandwidth (bps) | frame rate | frame size (H.263/H.264) |
|---|---|---|
| >500K | 30fps | 352 × 288/320 × 240 |
| <500K | 15fps | 176 × 144/160 × 120 |

TABLE 3

Focus Point Computer in Multi-Participant Conference

| bandwidth (bps) | frame rate | frame size (H.264) |
|---|---|---|
| >500K | 30fps | 320 × 240 |
| 200K-500K | 15fps | 160 × 120 |
| <200K | 15fps | 80 × 60 |

At 230, the focus-point assessment process 200 of some embodiments sets the computer's default conference capabilities not only based on the bandwidth estimate but also on the hardware inspection described above. Table 4 below illustrates one possible set of these rules that are based on both hardware and bandwidth considerations. As shown in this table, the hardware configurations can include type, speed, and number of processors, where the processors in this example are the G-series processors used by Apple Computer, Inc.

TABLE 4

Maximum Conferencing/Encoding Capability by Processor

| #, type processor(s) speed (in GHz) | frame rate | frame size (H.263/H.264) |
|---|---|---|
| 2, G5 (2.5+) | 30fps | 352 × 288/640 × 480 |
| 1, G4 (0.933-1.33) | 15fps | 352 × 288/160 × 120 |
| 1, G3 (0.600-0.867) | 15fps | 176 × 144/na |

Some embodiments may store the information gathered by the focus-point assessment process 200 for later use. For instance, this stored information may be used later if the conferencing application cannot establish contact with the bandwidth determining server. This information may also be transmitted to a participant as part of a call or invitation to conference. The invitation to begin a conference is described next.

B. Setting Up a Multi-Participant Conference

Figure 4:
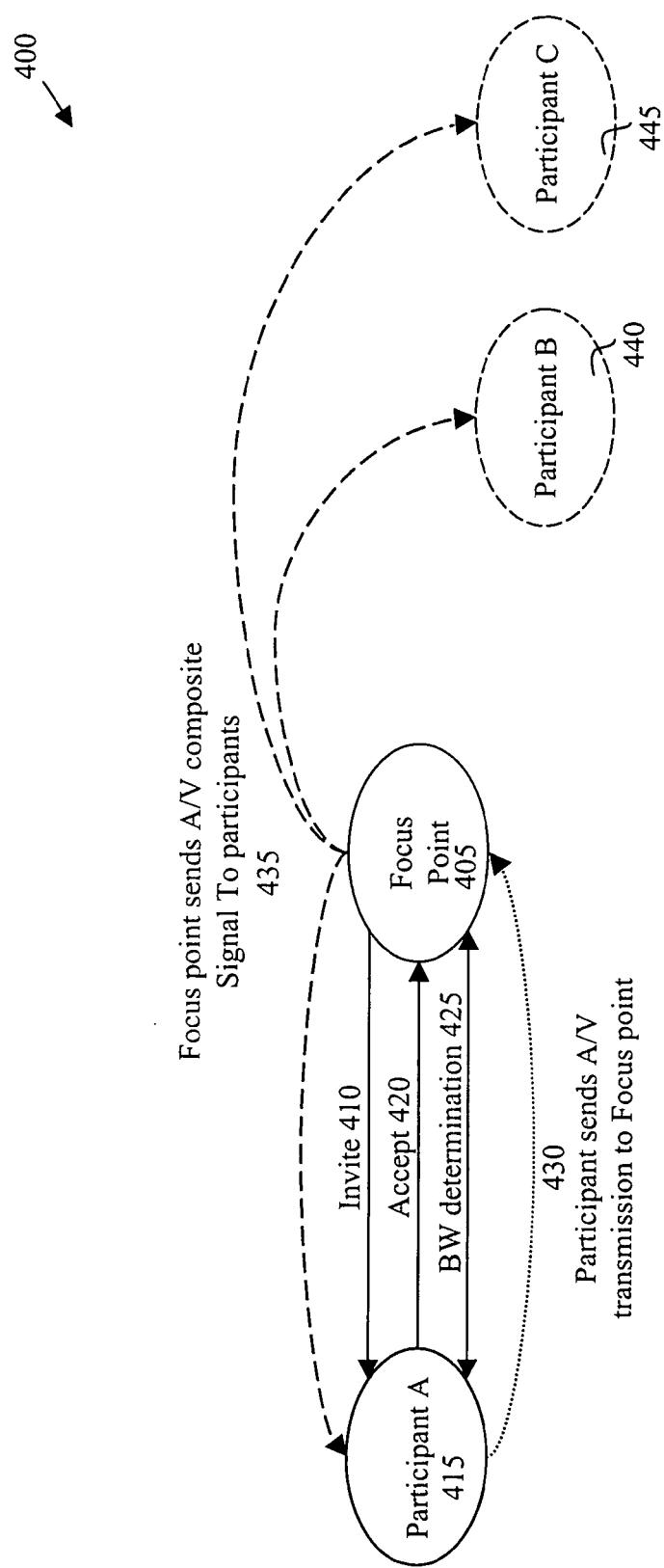
FIG. 4 illustrates a first computer inviting a second computer to establish a two-participant conference.
Figure 5:
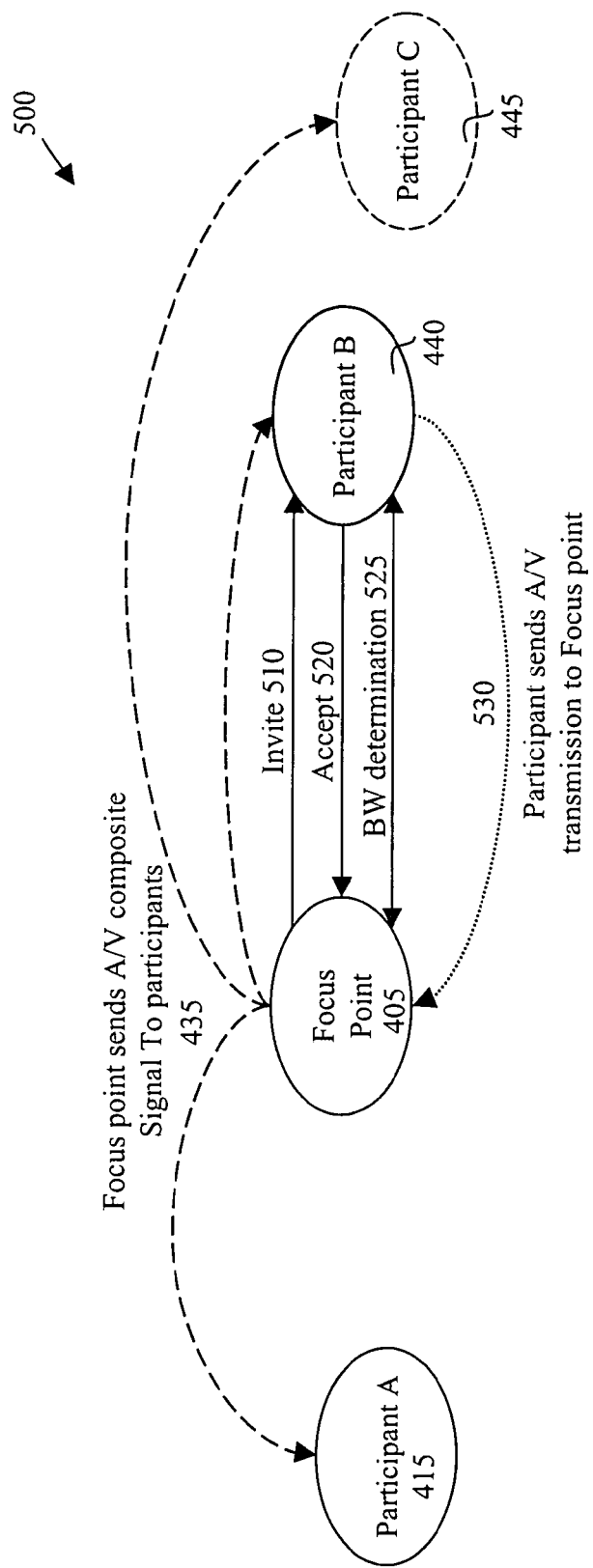
FIG. 5 illustrates a first computer inviting a third computer to establish a multi-participant conference.
Figure 6:
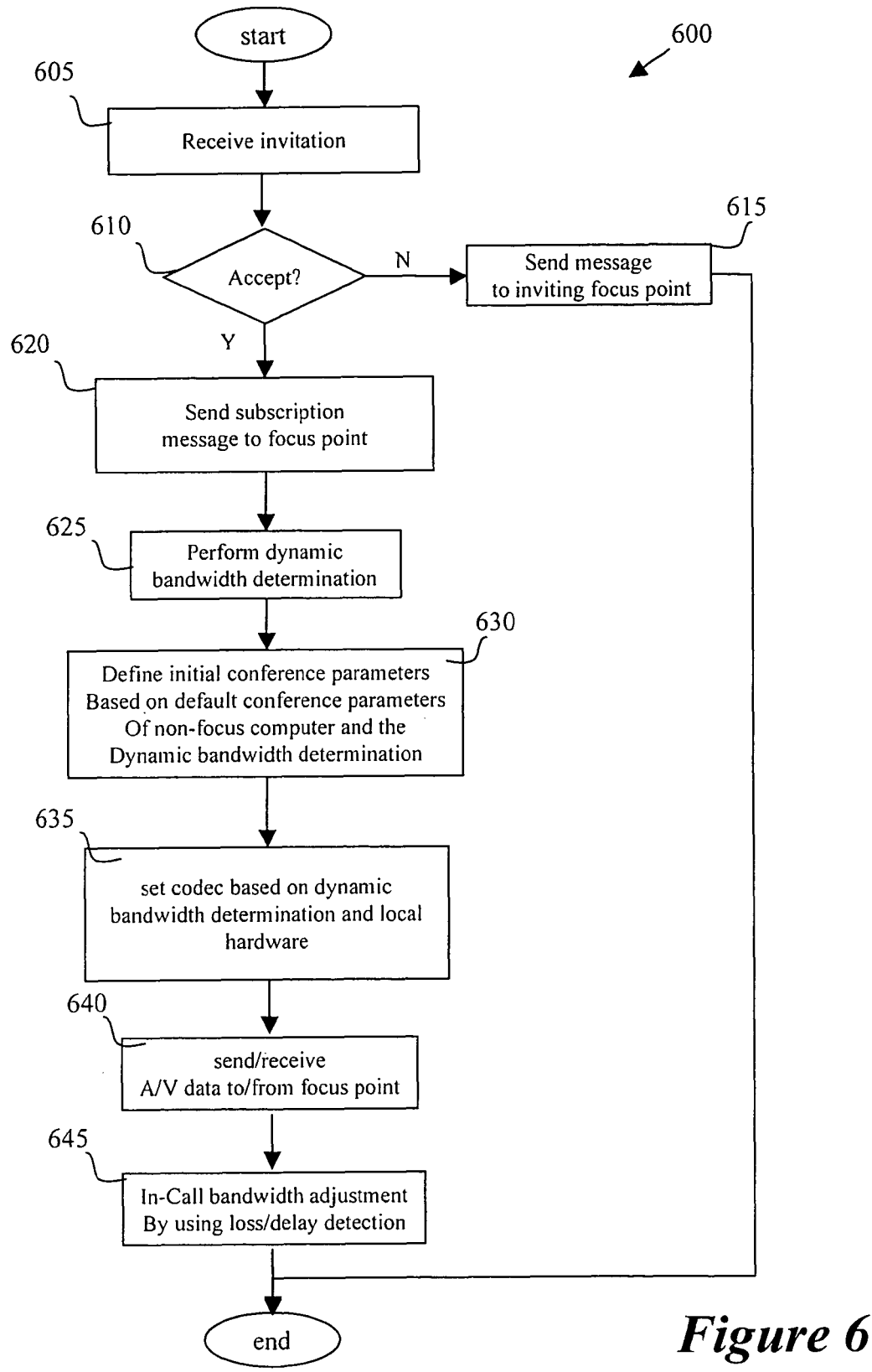
FIG. 6 illustrates a detailed process flow of acceptance by a participant.

Once a computer is deemed focus point capable, the computer may initiate a two-participant conference with another computer. The focus point capable computer may further invite additional non-focus computers to establish a multi-participant conference. FIGS. 4-6 illustrate one example of such a multi-participant conference set up.

Specifically, FIG. 4 illustrates a process 400 that first focus-capable computer 405 of some embodiments performs to invite a second computer 415 to join a conference. The focus capable computer 405 may then invite additional non-focus computers 440 and 445 to join the conference in-progress, in order to establish a multi-participant conference. For purposes of nomenclature, the focus capable computer will be referred to as a focus computer when a third (non-focus) computer joins the existing two-participant conference and a multi-participant conference is established.

1. Invitation and Acceptance

In the examples illustrated in FIGS. 4-6, it is assumed that the first computer 405 has been designated focus point capable by a focus-point assessment process 200 that was performed previously. To initiate a new conference, the first focus-capable computer 405 sends an invitation 410 to a second computer 415. In some embodiments, the invitation 410 typically includes the maximum conference capabilities of the first focus-capable computer 105. These capabilities are part of the set of default conference parameters (e.g., frame rate and size, codec, static bandwidth and hardware configuration) that were defined for the computer 405 in the previously performed assessment process 200. Also, in some embodiments, the invitation uses messaging over Session Initiation Protocol (SIP), which will be further described in detail later.

In some embodiments, a participant operating the first computer may specify conference parameters that do not utilize the first computer's full conferencing capabilities (e.g., selecting an audio conference even though the first computer 405 might have sufficient resources for a high definition video conference). Hence, in such cases, the invitation 410 does not include the maximum conference capabilities of the first focus-capable computer 105.

Upon receiving the invitation, the second computer 415 may decline or accept. The second computer 415 may decline by sending a message to decline to conference. The second computer 415 may also accept by sending an acceptance message 420 back to the first focus-capable computer 405. The acceptance message of some embodiments may include a subscription message. The subscription message informs the first focus-capable computer 405 that the second computer should receive conference notifications. In some embodiments, the acceptance message includes one or more conferencing parameters that indicate the second computer's conferencing capabilities in addition to the acceptance of the offer to conference. In some embodiments, the acceptance also uses messaging over Session Initiation Protocol (SIP).

If the second computer 415 accepts, then the first focus-capable computer 405 and the second computer 415 perform a dynamic bandwidth determination 425 between their two locations. In some embodiments, the dynamic bandwidth determination may aid in configuring the initial conference settings for the new two-participant conference. For instance, the dynamic bandwidth determination may aid in setting the initial frame rate and size for the encoders of the participants' computers.

The dynamic bandwidth determination of some embodiments measures the speed and/or loss rate of the connection between two computers by transmitting and receiving a series of successively larger packet groups. For instance, one embodiment sends three groups of packets from each transmitter to each receiver of the two computers. In this embodiment, the first group contains relatively small packets that are suitable for estimating the bandwidth of slow connections (e.g., less than 100 Kbps). The second group contains larger packets for estimating medium speed connections (e.g., between 100 Kbps and 500 Kbps). The third group contains large packets, which allows accurate bandwidth estimation for higher speed connections (e.g., greater than 500 Kbps). Some embodiments that employ this technique can make accurate estimates in less than one second. The process of dynamic bandwidth determination is described further in U.S. patent application Ser. No. 10/770,181, entitled "Automatic Detection of Channel Bandwidth," which is incorporated herein by reference.

During the dynamic bandwidth determination of some embodiments, one of the participants' computers may downgrade one or more of the computer's local conferencing parameters based on the actual determined dynamic bandwidth available for the conference. For instance, one computer might be capable of large frame sizes, but the bandwidth of the connection of the other computer may not support large frame sizes. Some embodiments use the tables shown above to adjust the computer's various local conferencing parameters based on the dynamic bandwidth determination. These adjustments to a computer's conferencing parameters, in turn adjusts the settings for the conference, both at setup and during the conference.

In some embodiments, the results of the dynamic bandwidth determination are stored to a log in non-volatile memory. These logged results may be examined to improve the bandwidth estimate by discarding outliers and performing averaging, or to accelerate the connection time of the conference by skipping the dynamic bandwidth detection step. Once dynamic bandwidth determination indicates the initial conference settings (e.g., the initial frame rate and size for the conference) between the participants' computers, the second computer 415 sends an A/V transmission to the first focus-capable computer 405.

Upon receiving the A/V transmission, the first focus-capable computer uses the initial conference settings for the conference. As described above, the initial conference settings form a set of parameters that contain the capabilities of the focus and non focus computers constrained by each participants' selections for the conference, and further constrained by the dynamic bandwidth determination. For instance, the first focus-capable computer of some embodiments uses the set of conference parameters to configure its coding and decoding modules for sending and receiving data to and from the second computer. These configurations might define a decoder for receiving data that was encoded by using a particular audio or video codec. These configurations might also define other means for handling incoming data such as the configuration of a resizer that adjusts the frame sizes, or of a frame rate controller that controls encoding and/or decoding frame rates. Similarly, these parameters may be used in some embodiments to define the properties of an encoder for sending data back out to the particular participant or to all the participants in the conference.

The codec components of the focus and non-focus capable computer will be further described in Sections IV and V. Also, as further described below in Section V, the ability of the focus and non-focus computers to dynamically set up their conference parameters based on their capabilities and the available bandwidth, allows the focus computer to establish a heterogeneous multi-participant conference. A heterogeneous conference is one where different conferencing computers participate differently in the conference (e.g., transmit and/or receive different types of data, utilize different A/V encoders, etc.).

2. Overview of Switching from a Two-Participant Conference to a Multi-Participant Conference Once a two-participant conference is underway, the first focus-capable computer 405 of some embodiments may invite additional computers, such as computers 440 and 445 in FIG. 4. In such a case, the two-participant conference changes to a multi-participant conference. For instance, FIG. 5 illustrates that the first focus-capable computer 405 may invite a third computer 440 (and a fourth computer 445) to the two-participant conference already established with the second computer 415.

FIG. 5 illustrates the invitation 510 and acceptance 520 involving the third computer 440. In some embodiments, the invitation and acceptance (as well as the invitation and acceptance of the fourth computer 445) proceed in the same manner as the invitation and acceptance process that were described above for the second computer 415.

However, in the embodiments described below, the process for inviting and accepting the third and fourth computers 440 and 445 is slightly more involved than the process for inviting and accepting of the second computer 415. For instance, when the third computer 440 accepts the invitation to join the conference, some embodiments will send a notification to any other subscribed computers, in this case the second computer 415, that the third computer 440 has joined the conference.

More specifically, once the third computer 440 (1) receives an invitation 510, (2) accepts 520, and (3) performs dynamic bandwidth determination 525 with the first focus-capable computer 405, the third computer 440 sends A/V data to the first focus-capable computer 405. As mentioned above, this A/V data might include a set of conference parameters that indicate the third computer's maximum capability for the conference. The first focus-capable computer 405 upon receiving the third computer's A/V data may make certain adjustments for supporting multiple participants in the newly established multi-participant conference.

For instance, as further described below, the first focus-capable computer 405 might realize that the addition of the third computer diminishes the available bandwidth between the first and second computers. Accordingly, the first focus-capable computer 405 might then adjust one or more conference settings (e.g., size of the video images transmitted back and forth) to account for this difference. The first focus-capable computer would make such adjustments as participants join or leave the conference in order to maintain the conference quality and reliability. Such adjustments are further described below in sub-sections 3 and 4.

One of ordinary skill will recognize that multiple variations are possible for the setup process illustrated in FIGS. 4 and 5. For instance, in the illustrated embodiment, only the focus computer 405 invites additional participants to join the conference. However, in other embodiments, a participant other than the focus computer 405 may invite additional participants to join the conference.

Some embodiments may limit the total number of participants to four video participants, or to ten audio participants, to preserve the quality of the conference. However, one of ordinary skill will recognize that many combinations of video and audio participants are possible. In some embodiments, only the available resources limit the permutations of participant combinations. As mentioned above, these resources might include the bandwidth and local hardware available to the conference participants of these embodiments.

3. Participant Computer After Acceptance

FIG. 6 illustrates a process 600 that a non-focus computer performs when it receives an invitation to join a conference from a focus computer. As shown in this figure, this process starts (at 605) when the non-focus computer receives an invitation from the focus computer. At 610, the non-focus computer's participant decides whether to accept the invitation to conference. If the non-focus computer's participant decides to decline the conference, the non-focus process 600 sends (at 615) a message to the focus computer declining the conference. After 615, the process 600 ends.

On the other hand, when the non-focus computer's participant decides to accept the invitation, the non-focus process 600 transitions from 615 to 620, where the non focus computer sends an acceptance to the focus computer. In some embodiments, the acceptance of the invitation includes the initial conference parameters (e.g., the codec, frame rate and size information) that indicate the static conferencing capabilities of the non-focus computer. Upon receiving this data, the focus computer of some embodiments defines the initial conference settings for its conference communications with the non-focus computer. Also at 620, the non-focus computer sends a subscription message to the focus computer. The subscription message triggers the focus and non-focus computers to begin (at 625) a dynamic bandwidth determination. As described above, this dynamic bandwidth determination identifies an estimated bandwidth between the focus and non-focus computers.

After the dynamic bandwidth determination at 625, the non-focus process 600 specifies (at 630) the initial conference settings (e.g., the codec, frame rate and size, etc.) that the non-focus computer should use in this conference. In some embodiments, the process specifies these settings (at 630) based on (1) the non-focus computer's default conference parameters, (2) the estimated bandwidth (identified at 630) between the focus and non-focus computers, and (3) any conference parameter specified in the focus computer's invitation.

The non-focus computer's default conference parameters are the conference parameters that the non-focus computer's video conferencing application specifies after this application performs its focus-point assessment process 200. The non-focus computer might not be able to use its default conference parameters when the focus computer invites the non-focus computer to a conference. For instance, the dynamic bandwidth determination (which is performed at 630) might specify an estimated bandwidth that might not be able to sustain some of the default parameters (e.g., frame sizes or codecs). Also, the focus computer's invitation might specify one or more conference parameters that are lower on the hierarchy of parameters. For instance, the non-focus computer's default conference parameters include the use of an H.264 encoder, but the focus computer's only invites the non-focus computer to use an H.263 encoder.

Accordingly, at 630, the process defines the initial conference parameters by starting with the non-focus computer's default conference parameters, and then possibly degrading one or more of these parameters to meet the parameters specified by the focus computer, or to meet the dynamically estimated bandwidth. When downgrading the parameters based on the dynamically estimated bandwidth, the process 600 traverses down the hierarchy of conference parameter sets in its conference parameter tables, which were described above. In some embodiments, downgrading the conference parameters might include, e.g., switching to a lower bit rate codec, reducing the frame rate and/or the frame size of the non-focus computer's encoder.

After 630, the process 600 defines the non-focus computers' A/V codecs (i.e., its one or more encoders and decoders) based on the initial conference parameters defined at 630. Next, at 640, the process 600 sends the non-focus computer's A/V data to the focus computer. After 640, the process 600 performs an in-call adjustment process, which might result in the modification of the conference parameters that the focus and non-focus computers use in the conference to communicate with each other. The in-call adjustment process will be described in the next sub-section. After performing the in-call adjustment process, the process 600 ends.

4. In-Call Adjustments due to Actual Available Bandwidth and Loss/Delay

Figure 7:
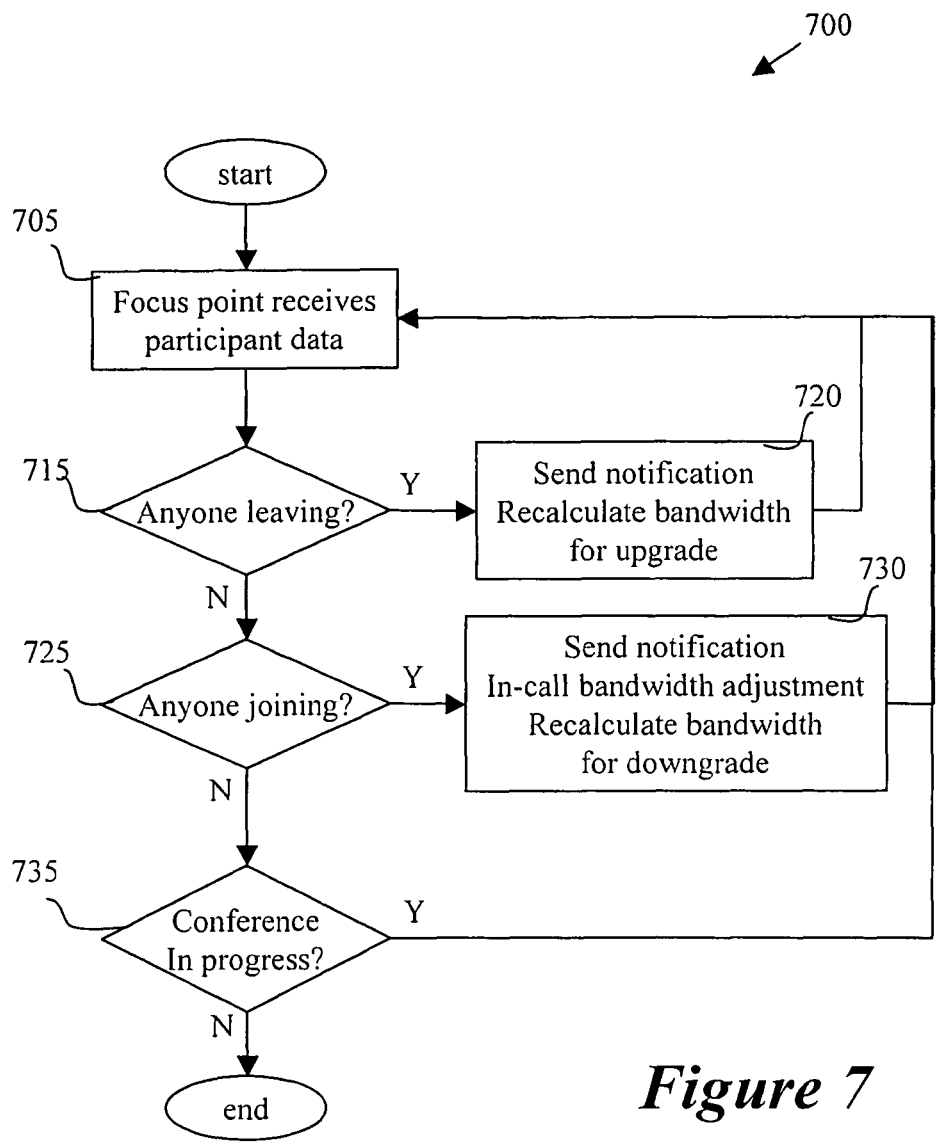
FIG. 7 illustrates a process flow for a focus computer that receives data from a participant after acceptance by the participant.

When participants join or leave a multi-participant conference, some embodiments allow for in-call adjustments to the conference parameters of one or more computers of one or more participants. FIG. 7 conceptually illustrates a process 700 that the focus point computer iteratively performs during a multi-participant conference. This process 700 allows the focus computer to initiate in-call adjustments when a participant leaves or joins the conference.

As shown in FIG. 7, the focus computer receives (at 705) A/V data from the participants during the conference. Next, at 715, the process 700 of the focus computer determines whether any participant has left the conference. If so, the focus computer sends (at 720) a notification of the participant's departure to the other participants in the conference. The non-focus computers of these other participants then use this data to deallocate the resources that they had previously allocated for decoding and displaying the departing participant's data.

At 720, the process 700 also initiates an in-call adjustment operation. This in-call adjustment operation can result in an upgrade of the conference parameters for one or more of the participants. For instance, the departure of a participant frees up more bandwidth for the focus computer to share with the remaining non-focus computers. This increase in bandwidth might in turn allow one or more of the computers to change to bigger frame sizes or better encoders. The computers might also change to bigger frame sizes or better encoders if the departing non-focus computer's capabilities and/or bandwidth previously required the focus point computer to utilize the smaller frame sizes or the weaker encoders. After a participant leaves, the focus and non-focus computers of some embodiments go through an adjustment period to detect losses and reset the conference parameters. This in-call adjustment period will be discussed in further detail below.

After 720, the process transitions to 705. From step 715, the process 700 transitions to 725 when it determines (at 715) that no participant has left the conference. At 725, the process 700 determines whether any new participant has joined the conference. If so, the focus computer sends a notification to the other participants in the conference that the new participant has joined at 730. Based on this notification, the other participants allocate resources for decoding and displaying the new participant's data.

At 730, the focus computer also performs an in-call adjustment operation, which might downgrade the conference parameters for one or more computers. For instance, the capabilities and/or bandwidth of the new participant's computer might require the focus computer to downgrade the conference parameters for the other computers. Also, the addition of the new participant might require the bandwidth that the focus point computer allocates to the other non-focus participants to be reduced below a threshold that would require one or more of the computers to redefine their conference parameters.

Also, at 730, the focus and non-focus computers commence an in-call loss detection operation for a particular interval of time (e.g., for 20 seconds) after the focus computer transmits the notification at 730 or the non-focus computers receive the notification at 730. If the detection operation of any of the computers detects packet loss, one or more conference parameters of one or more computers might be modified, as further described below.

After 730, the process 700 transitions to 735, where it determines whether the multi-participant conference is still in progress. If not, the process ends. Otherwise, the process returns back to 705, which was described above.

a) In-Call Loss Detection

Figure 8:
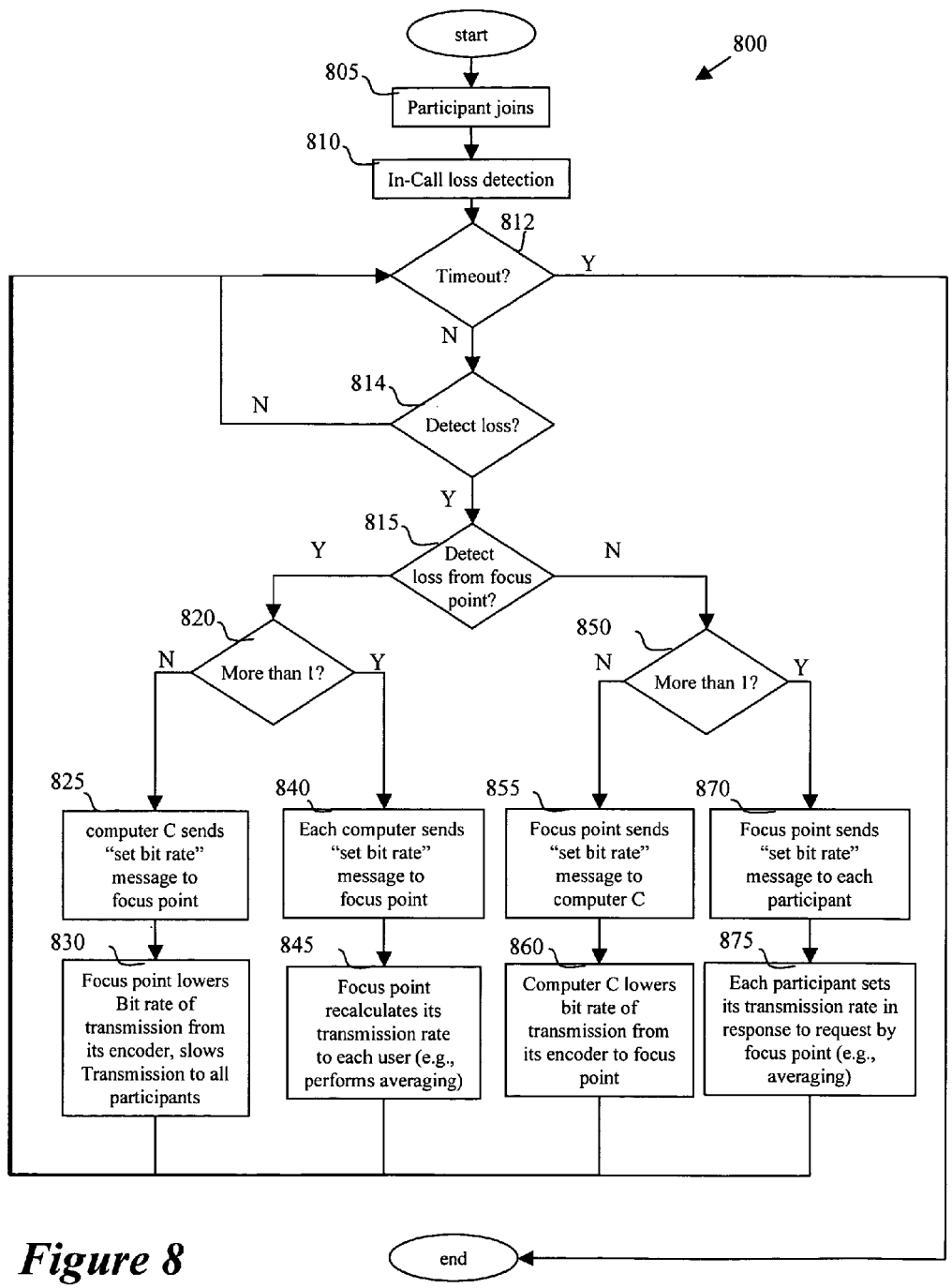
FIG. 8 illustrates an in-call bandwidth adjustment process.

As mentioned above, some embodiments perform in-call bandwidth adjustments particularly at the start of a new conference or when a new participant joins a conference already underway. FIG. 8 conceptually illustrates an in-call bandwidth adjustment process 800 of some embodiments. The in-call bandwidth adjustment process 800 begins at 805 when a new non-focus computer joins the conference.

After the new computer joins the conference, the focus and non-focus computers perform (at 810) an in-call loss detection operation. Such an operation is commenced when the focus point computer (at 730 of the process 700 of FIG. 7) starts such an operation and instructs each non-focus computer to perform such an operation.

The focus computer of these embodiments may also perform in-call bandwidth detection with the other computers already in the conference. These embodiments attempt to preserve the quality of the conference for the participants by detecting the transmission quality for each participant. In these embodiments, packet loss and delay may be used as a particular measure of quality for the in-call adjustments. Although, other embodiments may employ different parameters to measure quality for the conference participants. Next, the method some embodiments employ to perform in-call bandwidth detection at 810 is described.

For a small time window at the beginning of a new conference or after a new participant joins a conference already in progress, each participant detects the amount of packet loss and delay at its receiver. This discussion will proceed by only referring to packet loss since packets exhibiting significant delay are considered dropped or lost during real-time transmission. For some embodiments, this small time window is approximately 15-20 seconds after acceptance by each participant joining the conference.

The in-call bandwidth detection at 810 might reveal that one or more participants' computers detect loss. If the time window for the in-call adjustment has not elapsed at step 812, then the process 800 checks for loss at step 814. If the process 800 does not detect loss at 814, then the process 800 returns to step 812 and continues to check for loss until the time elapses at step 812, otherwise the process concludes.

If the process 800 detects loss at step 812, the focus computer will then determine the type of loss at 815. In some embodiments, the type of loss detected at 812 can be divided into four categories of loss, or states of the conference during the time window for the in-call bandwidth detection. These embodiments may then respond appropriately to the type of loss detected. These conditional states may trigger in-call adjustments that will be described in further detail below. In some embodiments, each of the four conditional states caused by a non-focus computer joining may cause the focus computer and other computers in the conference to pass additional messages to and from each other. The conferencing computers might use these messages to indicate their particular status or needs during the conference and up/downgrade the conference in response to the messages. In some embodiments, the focus computer redistributes its upload bandwidth to each computer in the conference.

For instance, FIG. 8 illustrates four conditional states 825, 840, 855 and 870 that some embodiments assume, which cause these in-call adjustments based on bandwidth. Specifically, state 825 and 840 represent conditions where one or more than one non-focus computer detects loss from the focus computer, respectively. States 855 and 870 represent conditions where the focus computer detects loss from one or multiple non-focus computers, respectively. The process 800 distinguishes the conditional states by using a two step inquiry beginning at step 815, where the process 800 determines whether the loss is from the focus point computer. If the loss is from the focus computer, the process checks whether the loss is detected by one or more than one participant at step 820. To distinguish the case where one participant experiences loss from the case where multiple participants experience loss, the focus computer will wait for approximately 500 milliseconds after a message from a non-focus computer indicating loss from that computer to see if other computers report loss. One of ordinary skill will recognize that other embodiments will wait for a time other than 500 milliseconds. If only one participant detects loss at step 820, then the process 800 transitions to step 825, which is the first of the four cases discussed in detail below.

Figure 10:
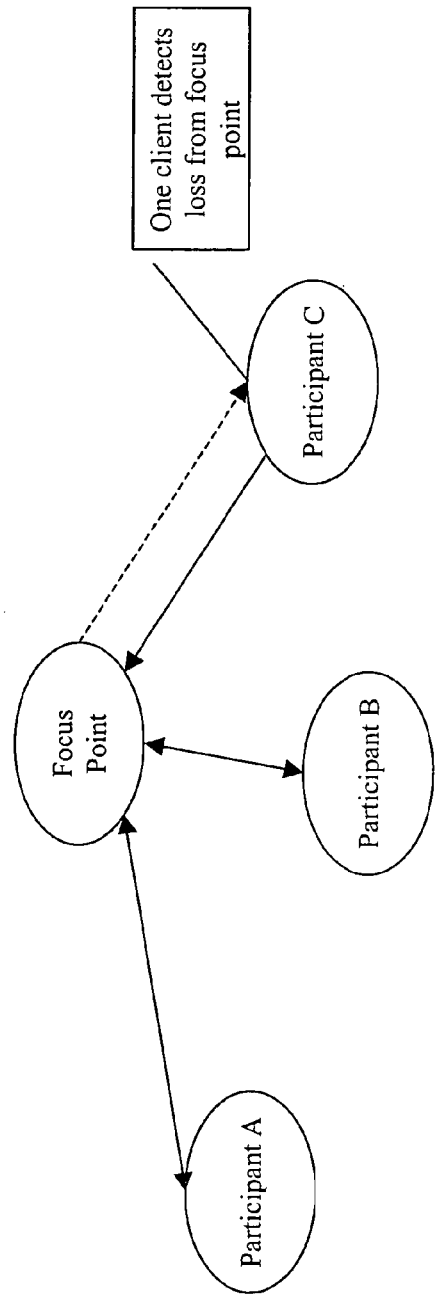
FIG. 10 illustrates a non-focus computer detecting loss from the focus computer.

Examples of What to do about Loss, Four Cases
Case_1: Computer C's Download is the Bottleneck.
Only Computer C detects loss from the focus computer.
FIG. 10 illustrates loss detected by one non-focus computer C for data from a focus computer (step 825 in FIG. 8). As shown in FIG. 10, solid lines to and from the focus computer represent normal data transmission. However, the dashed line from the focus computer to the non-focus computer C indicates loss detected by the non-focus computer C. In this condition, the non-focus computer C of some embodiments will send a "set bit rate" packet to the focus computer (at 825). Thus, when only one participant detects loss, the focus computer of these embodiments adjusts the frame rate and/or the frame size (i.e., the bit rate) at the focus computer's encoder to accommodate the non-focus computer experiencing loss/difficulty with reception (at 830). In some embodiments, the focus computer sets its transmission bit rate to the value contained in the set bit rate packet (i.e., to the value requested by the non-focus computer detecting loss).

For the embodiments where the focus computer only transmits using one encoder, the focus computer's transmission will be downgraded for all participants in the particular conference. In other words, the focus computer typically sends the same bit rate (i.e., the bit rate of the most constrained participant) to all non-focus computers in these embodiments. In this case, the non-focus computer C is said to be the bottleneck for the conference (likely due to lack of sufficient download bandwidth). Should the non-focus computer C leave the conference, the focus computer of some embodiments might then re-evaluate the conference parameters to check whether it is possible to upgrade the conference for the remaining participants.

After the process 800 performs the in-call adjustment based on the loss detected by one non-focus computer at step 830, the process 800 returns to step 812 to check whether the time has elapsed. In some embodiments, the process 800 repeats several times before the time has elapsed. If the time has elapsed at step 812, the process 800 concludes. Otherwise, the process 800 proceeds to step 814 as described above. If at step 820, however, the process 800 determines that more than one participant detects loss from the focus computer, then the process 800 transitions to step 840.

Case_2: Focus Computer's Upload is the Bottleneck,
e.g., Computers A, B and C each detect packet loss from the focus computer.

Figure 12:
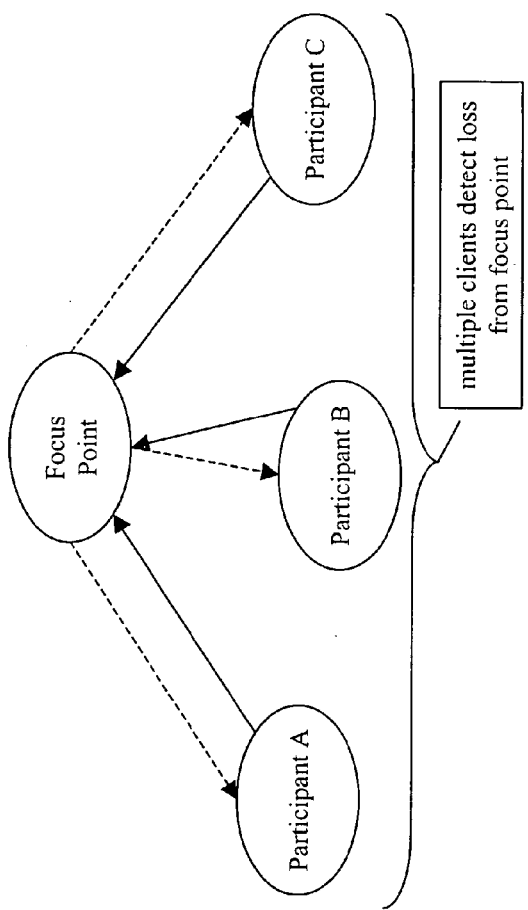
FIG. 12 illustrates multiple non-focus computers detecting loss from a focus computer.

FIG. 12 illustrates loss detected by multiple participants for data from the focus computer (step 840 in FIG. 8). As shown in FIG. 12, solid lines represent normal data transmission, while dashed lines represent packet loss. In some embodiments, when the focus computer receives notification of loss from multiple participants (at 840), the focus computer resets its transmission bit rate to each participant (at 845). In some embodiments, each non-focus computer sends a request for a different bit rate in a set bit rate packet to the focus computer. The focus computer of these embodiments may sum the value contained in the bit rate requests and divide by the number of requests it receives to adjust its transmission bit rate. In other words, the focus computer of these embodiments sets its transmission bit rate to the average rate requested by those participants in the conference that reported loss. In these embodiments, the focus computer may adjust its transmission bit rate by adjusting the frame rate or frame size of its encoder. For the embodiments in which the focus computer only uses a single encoder, the transmission bit rates to each non-focus computer are typically equal.

As mentioned above, to distinguish the first case (where the participant C was the bottleneck, and the only recipient reporting loss) from the second case (where multiple recipients report loss), the focus computer of some embodiments will wait before resetting its transmission bit rate, to see how many participants report loss. The waiting period may be different in different embodiments (e.g., 500 milliseconds, one second, etc.).

After the process 800 makes adjustments based on loss from the focus computer detected by multiple non-focus computers at step 845, the process 800 returns to step 812 to check whether the time has elapsed. If at step 815, the process 800 determines that the loss is not detected from the focus computer (i.e., the loss is from one or more non-focus computers), then the process 800 transitions to step 850 to determine from how many computers the focus computer detects loss. The focus computer of some embodiments may perform this determination by using the same waiting method as described above. If only one computer detects loss at step 850, then the process 800 transitions to step 855.

Figure 9:
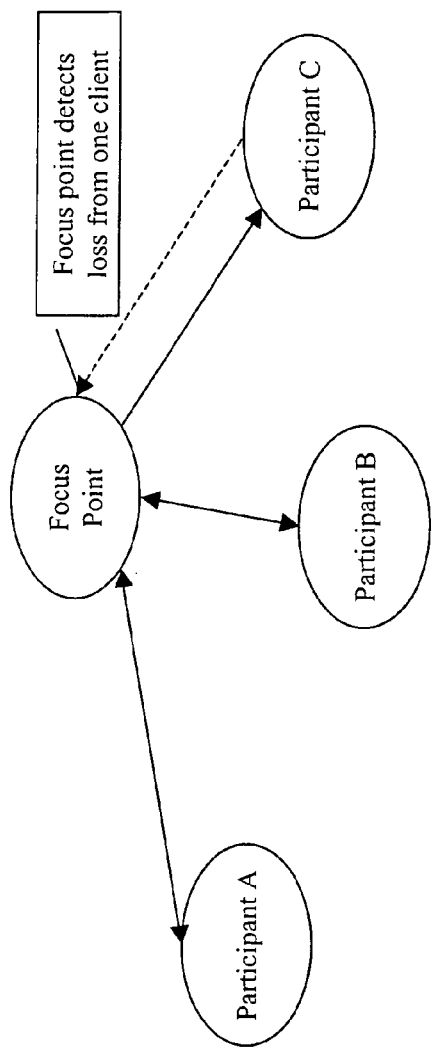
FIG. 9 illustrates a focus computer detecting loss from one non-focus computer.

Case_3: Computer C's Upload is the Bottleneck.
FIG. 9 illustrates loss detected by a focus computer for data from one non-focus computer C (step 855 in FIG. 8). As shown in FIG. 9, the solid lines to and from the focus computer indicate normal data transmission, while the dashed line from the non-focus computer C to the focus computer indicates loss (e.g., dropped or delayed packets) detected by the focus computer. When the focus computer detects loss from only one non-focus computer, the focus computer of some embodiments may send a request to that non-focus computer, in this case non-focus computer C, to lower the non-focus computer's transmission bit rate (at 855). In some embodiments, the request is contained in a "set bit rate" packet. The focus computer of some embodiments may request that the non-focus computer lower its transmission bit rate equal to the bit rate of the most constrained participant in the particular conference. In this case, the non-focus computer C is likely not the most constrained participant in the conference. However, reducing the computer C's transmission bit rate (at 860) will allow the focus computer to maintain the conference (i.e., to adequately send and receive conference data to and from all of the conference participants, including the most constrained participants).

Once the process 800 adjusts to the loss detected from one non-focus computer at step 860, the process 800 returns to step 812 to check whether the time has elapsed. If the focus computer detects loss from more than one non-focus computer at step 850, then the process 800 transitions to step 870.

Case_4: Focus Computer's Download is the Bottleneck.

Figure 11:
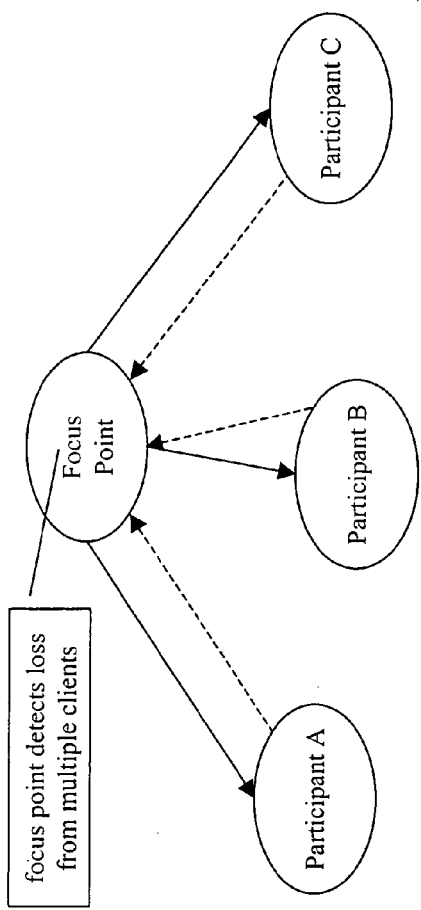
FIG. 11 illustrates a focus computer detecting loss from multiple non-focus computers.

FIG. 11 illustrates loss detected by the focus computer for data from multiple participants (step 870 in FIG. 8). In FIG. 11, the dashed lines indicate loss of packets detected by the focus computer for data from each non-focus computer A, B and C in the conference. When the focus computer detects loss from multiple participants, the focus computer of some embodiments sends a "set bit rate" packet to all the conference participants to lower their transmission bit rates to a rate determined by the focus point (at 870). The focus computer of some embodiments requests the bit rate of each participant to be set at the average bit rate previously received from all the non-focus computers in the conference (at 875). Upon receiving the set bit rate packet from the focus computer, each non-focus computer will set its transmission bit rate to the requested bit rate. In this case, the focus computer is said to be the bottleneck in the conference. This bottleneck is likely due to insufficient download bandwidth for the focus computer. Once the process 800 adjusts the conference for this kind of loss at step 875, the process 800 returns to step 812 to check whether the time has elapsed. As mentioned above, the process 800 may repeat several times before the time elapses at step 812. Once the time has elapsed at step 812, then the process 800 concludes.

An Example of the Three Bandwidth Adjustments for a Conference

At this time, it might be useful to review three possible opportunities to configure a conference based on bandwidth at three separate times for a given conference. To distinguish these three configuration phases, they are referred to as (1) static estimation, (2) dynamic determination, and (3) in-call adjustment. For instance, a focus capable participant may initially (1) estimate that it is capable of sending at about 1.0 Mbps at application startup. During invitation and acceptance of a conference, a non-focus computer and the focus computer may (2) determine that each is able transmit and receive at about 1.0 Mbps in the conference. After which, a third participant may join the conference. The third participant may have (1) estimated its own bandwidth at 1.0 Mbps when its conferencing application started. The third participant may also (2) determine that a 1.0 Mbps conference is possible with the focus computer.

Figure 13:
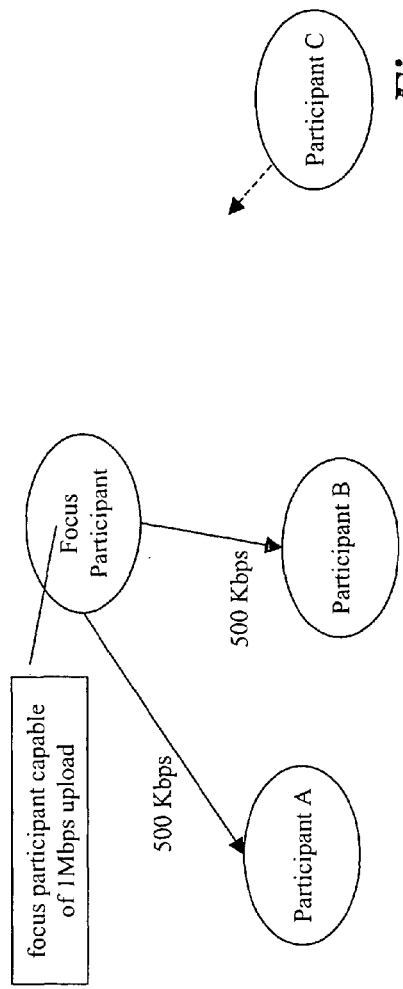
FIG. 13 illustrates a focus computer distributing its upload bandwidth over two participants.
Figure 14:
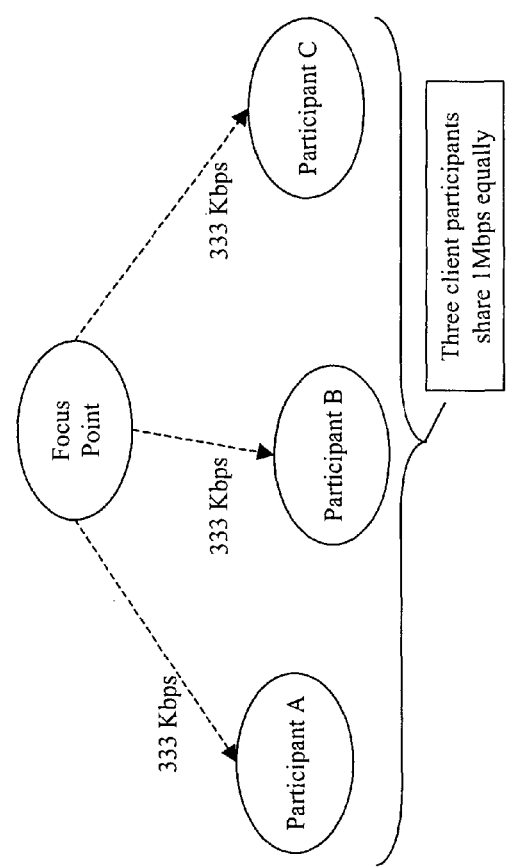
FIG. 14 illustrates a focus computer distributing its upload bandwidth over three participants.

However, the focus computer is already conferencing at its maximum 1.0 Mbps upload with the second participant's computer. In this situation, the in-call bandwidth adjustment (3) should detect loss at either or both of the second and third participants. Upon encountering this situation, the focus computer will downgrade the conference (i.e., will divide its available 1.0 Mbps upload bandwidth between the second and third participants) to preserve the quality of the conference for all subscribed participants. FIG. 13 illustrates an example where the focus computer divides its 1.0 Mbps upload over two non-focus computers. FIG. 14 illustrates an example where the focus computer redistributes its 1.0 Mbps for three non-focus computers at 333 Kbps each, when a non-focus computer C joins. This example of a third participant joining a two-participant conference to form a multi-participant conference illustrates one embodiment, of an in-call bandwidth adjustment. Specifically, the focus computer performs in-call adjustment by bandwidth redistribution. The components and operation of the focus computer during a conference is discussed in Section IV.

III. SIP Messaging and Encryption

Some embodiments allow messaging over a different set of ports than the ports used for video or for audio data transmission. Some of these embodiments employ messaging over Session Initiation Protocol (SIP), which is particularly useful for setting up a conference (invitation and acceptance), and for sending messages during the conference (e.g., status updates regarding participants joining or leaving). These messages can be used for signaling setup procedures and up/down-grade procedures at various times during a conference (i.e., when participants join or leave).

The typical Session Initiation Protocol (SIP) packet includes a header and a body. Some embodiments add additional information to the SIP packet body by using the Session Description Protocol (SDP). SDP information may contain certain parameters useful in video encoding such as codec, frame rate, and image size. For instance, to invite to conference, the focus computer of some embodiments will send a SIP packet containing a proposed set of conference parameters that are stored in bit fields (e.g., codec, frame rate, and image size, hardware description, and conference status). Particularly novel in some embodiments is the SDP information in the invitation sent by the focus computer. In some embodiments, this SDP information includes the default image sizes for peer-to-peer and multi-participant conferences, when setting up a new conference, and for up/down-grading an existing conference. These embodiments may also include the set of standard SDP information typically required for conferencing. This set of standard SDP information is defined in the IETF specification regarding SIP.

As mentioned above, the messages of some embodiments include parameters such as conference status, bit rate, and hardware description, which may include machine and processor type (e.g., PowerPC G3, G4, G5, etc.), number of CPUs, and speed of CPUs. Conference status information typically includes the number of participants and/or the participants who are joining/leaving with their conferencing capabilities and hardware descriptions.

In these embodiments, a focus computer may send a set of proposed conferencing parameters in an invitation to conference message by using a SIP packet. The recipient of the SIP packet can compare its conference capabilities with the invitation sent by the focus computer to aid in the formulation of an acceptance message and/or the initial conference packets. As previously mentioned, these initial conference packets may include conference parameters as well as A/V data intended for the focus computer. The SIP packet recipients of these embodiments may further cache information from the received invitation message for future reference in the present conference, or even future conferences involving the particular focus computer that sent the invitation.

During acceptance, the client can send a confirmation SIP packet containing SDP parameters with the same conference parameters that were offered by the focus computer, or with one or more downgraded parameters (e.g., a smaller image size, a lower codec such as H.263 instead of H.264). The SDP parameters for the conference may also be adjusted at various times during a conference. For instance, the conference parameters may be downgraded when the conference changes from a two-participant to a multi-participant conference and when additional participants join the multi-participant conference. Conversely, the conference parameters may be upgraded when participants leave the conference and, specifically, when the conference changes from a multi-participant to a two-participant conference.

In other words, the various bandwidth measurements for the embodiments above, when used in conjunction with a set of rules, may determine the capabilities of each encoder and the availability and settings of each decoder for each participant in a conference. These capabilities and settings may form the parameters for a conference. For instance, a group of participants with G5 processors can perform videoconferencing at 320×240 resolution using the H.264 codec. More examples of these rules are illustrated in the tables of Section II of this application. The conference parameters may need to be passed or updated at various times during a conference. This task is accomplished in some embodiments through the use of SIP packets containing SDP fields to hold the "session description" information.

Some embodiments transmit the SIP packets over the Universal Datagram Protocol (UDP). However, a multi-participant conference may have too much hardware description and bandwidth information in the SIP packets to fit in a single UDP packet. Thus, some embodiments compress the SIP/SDP information and tags. This compression shortens attribute names, status strings, and XML tags. These embodiments allow the conference messages to continue to be relayed by using SIP over UDP. As is known in the art, UDP has particular advantages for real-time transmission, such as A/V data transmissions during multi-participant conferencing.

Some embodiments use an automated encryption process to securely initiate a conference and securely transmit A/V data between a focus computer and non-focus computers. This encryption process selects the type of encryption to use between the focus computer and a non-focus computer by traversing a hierarchy of encryption options based on the encryption capabilities of the focus and non-focus computers (e.g., based on whether each participant's computer supports certificate based encryption, or another method of encryption). This encryption process also pre-tabulates counter and encryption keys during system idle time (e.g., before the next packet is encoded). During a conference, the most compute-intensive operation is the encoding of video information for transmission in packets. The encoded data packets may then be encrypted by using an encryption key. Encryption of data packets might involve applying the encryption key to a data packet through a logic function (e.g., XOR), which does not add much computation. However, calculation of the key for encryption may lengthen the time to send a data packet. Thus, some embodiments pre-calculate an encryption key in a separate process from the encoding process, before the encryption key is needed for a packet, or even before the video data for that particular packet enters the encoder. In these embodiments, one or more keys may be calculated and stored for use with the next grouping of data that is intended for encoding and packetization, after a previous packet is transmitted but before the next packet is encoded.

IV. Operation

A. Example of Focus-Point Video Conference

Figure 15:
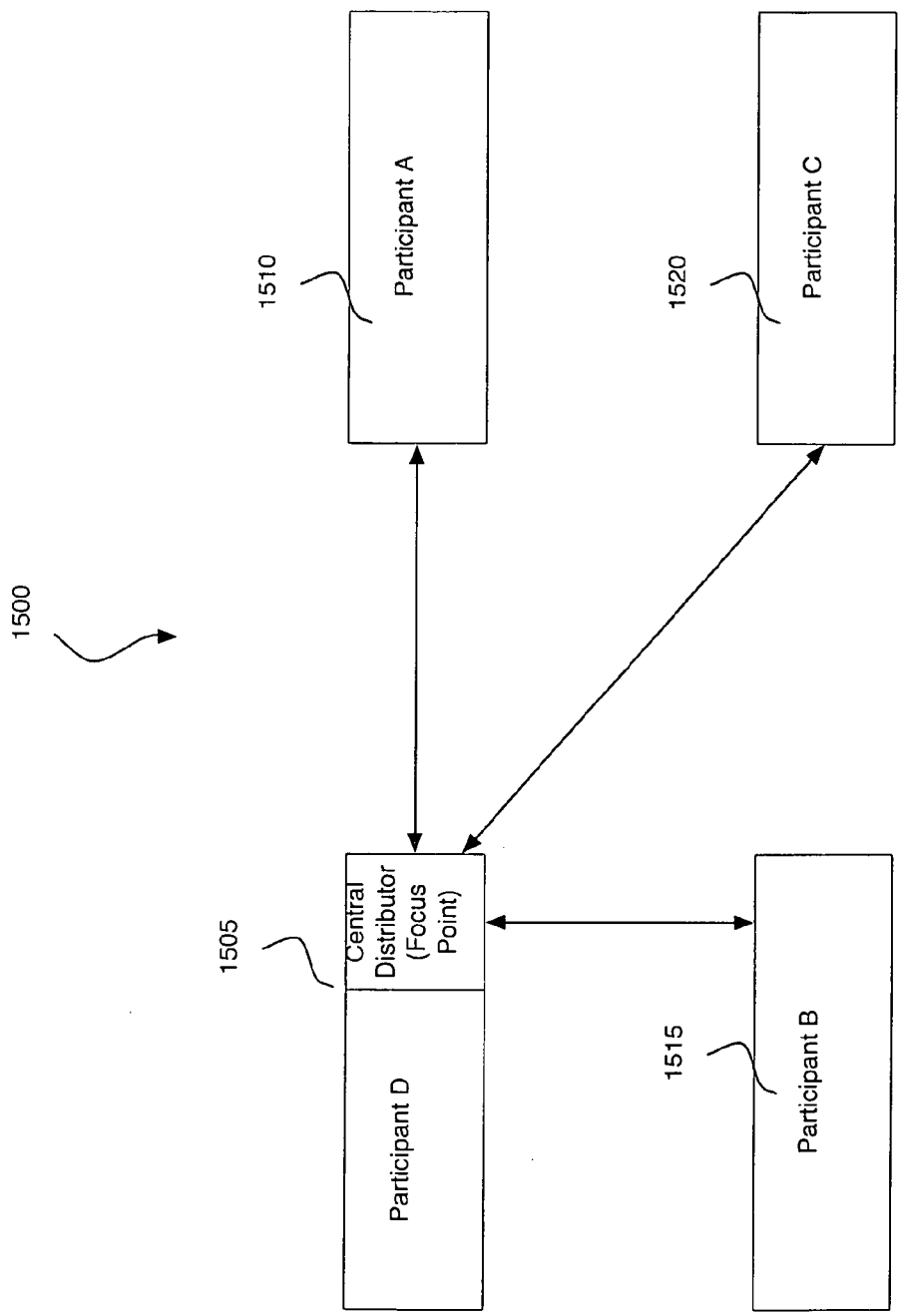
FIG. 15 illustrates an example of a video conference.

FIG. 15 illustrates an example of a video conference 1500 according to the focus-point architecture described above. In this example, a focus computer 1505 of a participant D is engaged in a video conference with three computers 1510-1520 of three participants A, B, and C through a network (not shown). As mentioned above, the focus computer 1505 serves as a central distributor of audio/video content during the video conference.

Figure 16:
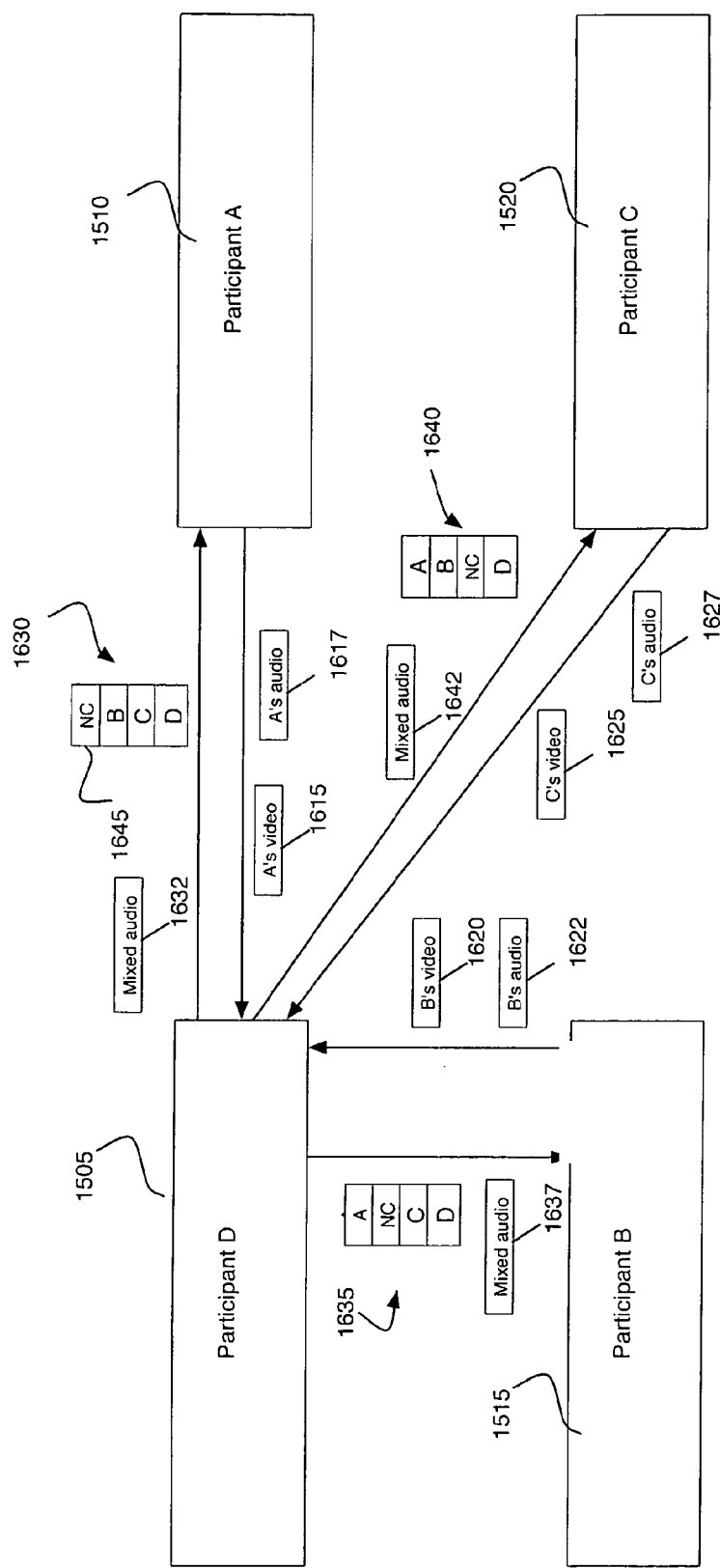
FIG. 16 illustrates an example of data exchange in a four participant conference.

As the central distributor of audio/video content, the focus point 1505 receives A/V data from each participant, composites and encodes the A/V data, and then transmits the composite A/V data to each of the non-focus machines. FIG. 16 shows an example of such an exchange for the four participant example of FIG. 15. Specifically, FIG. 16 illustrates the focus point 1505 receiving one video frame 1615-1625 from each participant.

From the received images 1615-1625, the focus point 1505 generates and transmits a composite frame to each non-focus participant. As shown in FIG. 16, the focus computer 1505 removes a particular non-focus participant's video frame from the composite frame that the focus computer 1505 transmits to the particular non-focus participant, in order to save bandwidth. For instance, FIG. 16 illustrates for participant A, a composite image 1630 that does not have participant A's own image 1615. Instead of a non-focus participant's own image, the focus computer inserts a empty-field flag 1645 in the location of the non-focus participant's image in the composite image 1630, in order to indicate the absence of the frame corresponding to the non-participant's own image. Once each non-focus computer receives its encoded composite image, the non-focus computer decodes the composite frame, extracts each of the sub-frames in the composite frame and then displays the decoded, extracted frames on its display. Some embodiments do not use the empty-field flag 1645, and instead simply remove the image of a particular non-focus participant from the composite image sent to the particular non-focus participant. For instance, in some embodiments, the non-focus point module's decoder determines how the video image is composed with remaining encoded sub images because each encoded macroblock in each image has an identifier that represents its location.

As shown in FIG. 16, the focus computer 1505 also mixes and encodes the audio signals 1617, 1622, and 1627 that it receives from the non-focus computers, and then transmits the mixed, encoded signals 1632, 1637, and 1642 to the non-focus computers. In some embodiments, the focus computer 1505 removes a particular non-focus participant's audio signal from the mixed audio signal that the focus point transmits to the particular non-focus participant, otherwise the particular non-focus participant will hear his own voice when the mixed audio is played on the participant computer's loudspeakers. Also, in some embodiments, the focus point 1505 calculates signal strength indicia for each participants' audio signals, and appends the signal strength indicia to the mixed signals that it sends to each participant. The non-focus computers then use the appended signal strength indicia to display audio level meters that indicate the volume levels of the different participants, and to pan the audio across the loudspeakers of a participant's computer in order to help identify orators during the conference.

Some embodiments are implemented by a video conference application that can perform both focus and non-focus point operations. In some embodiments, this video conference application has two modules, a focus-point module and a non-focus point module that run on top of an operating system of a video-conference participant's computer. During a multi-participant video conference, the video conference application uses the focus-point module when this application is serving as the focus point of the conference, and uses the non-focus point module when it is not serving as the focus point. The focus-point module performs focus-point A/V processing operations when the video conference application is the focus point of a multi-participant video conference. On the other hand, the non-focus point module performs non-focus point A/V processing operations when the application is not the focus point of the conference. In some embodiments, the focus and non-focus point modules share certain resources.

The focus-point module of the focus computer 1505 and the non-focus point modules of the non-focus computers 1510-1520 are described in the sub-sections below.

B. Focus-Point Module's Video Codec Section

Figure 17:
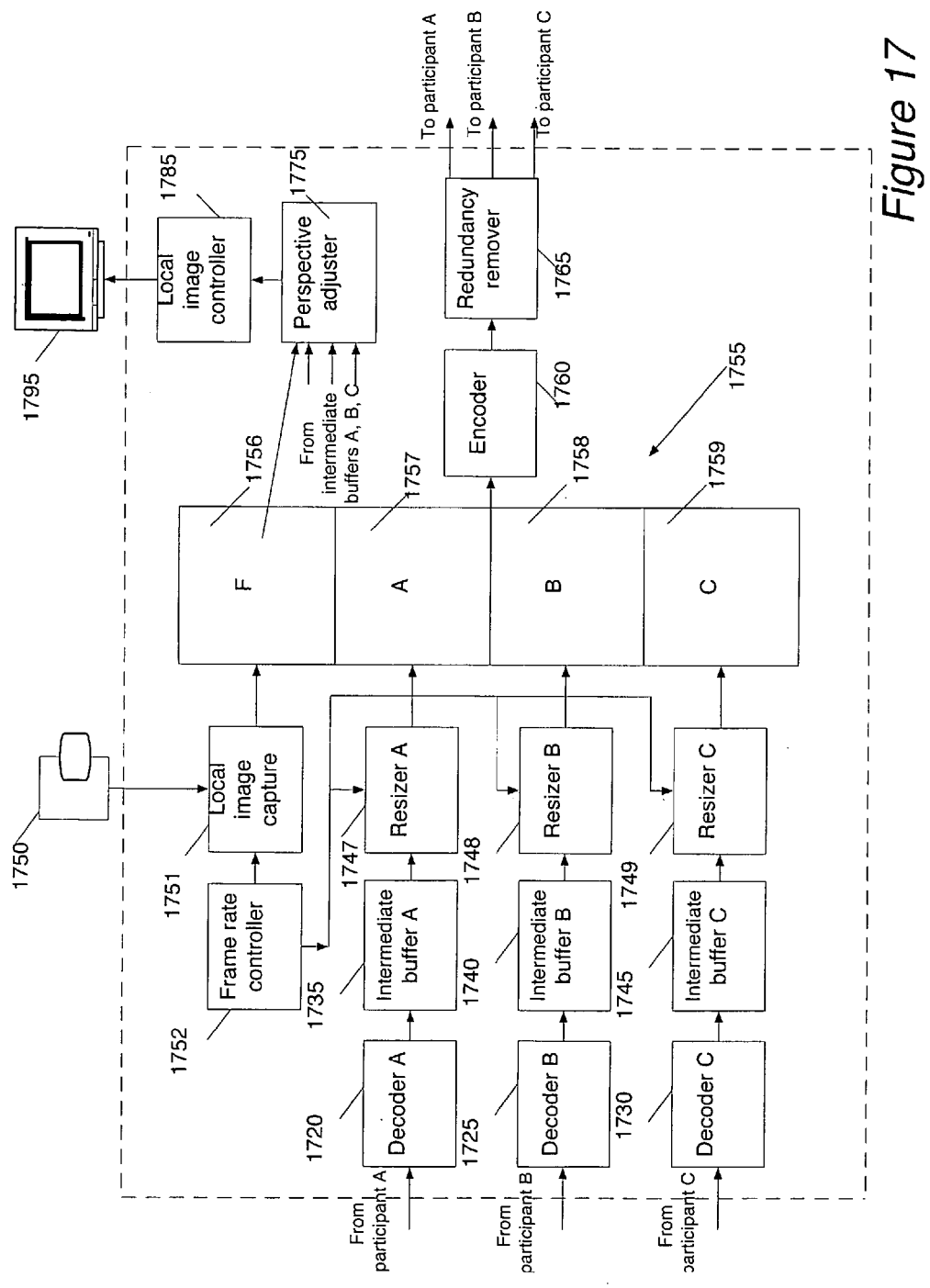
FIG. 17 illustrates the video codec section of the focus point module or a focus computer.

For some embodiments of the invention, FIG. 17 illustrates the video codec section of the focus-point module of focus computer 1505 of FIG. 15. FIG. 17 shows focus-point module as utilizing three decoders 1720-1730, three intermediate buffers 1735-1745, three resizers 1747-1749, a local image capture module 1751, a frame rate controller 1752, a composite image buffer 1755, an encoder 1760, a redundancy remover 1765, a perspective adjuster 1775, and a local image controller 1785.

The decoders 1720-1730, the intermediate buffers 1735-1745, and the resizers 1747-1749 form three video decoding pipelines into three sections 1757-1759 of the composite image buffer 1755. These three video decoding pipelines allow the focus-point module to decode and composite video signals from non-focus computers 1510-1520 during the video conference.

Specifically, each decoder 1720, 1725, or 1730 is responsible for decoding video signals from one non-focus computer during a video conference. The focus computer 1505 defines a decoder for a particular non-focus participant during the set up process when the particular non-focus participant joins the conference. The focus computer 1505 might subsequently change or modify this decoder as a result of subsequent in-call adjustment operations.

After decoding a received frame, each decoder 1720, 1725, or 1730 stores the decoded frame in an intermediate buffer 1735, 1740, or 1745, which, in some embodiments, is a location in the memory of the focus-point computer. At a particular frame sampling rate, each resizer 1747, 1748, or 1749 (1) retrieves a frame that is stored in its corresponding intermediate buffer, (2) resizes this frame, if such resizing is necessary, and (3) stores the frame in its corresponding section in the composite image buffer 1755. For instance, the resizer 1748 retrieves a decoded frame of the participant B from the intermediate buffer 1740, resizes this retrieved frame if necessary, and stores this frame in the composite-buffer section 1758.

The frame rate controller 1752 defines the frame sampling rate at which the resizers 1747-1749 retrieve frames from the intermediate buffers 1735-1745. The frame rate controller 1752 determines this rate based on a variety of factors, which may include the system bandwidth, the computational resources of the focus-point computer, the number of participants in the video conference, etc. At the frame sampling rate that the controller 1752 supplies to the resizers 1747-1749, the frame rate controller 1752 also directs the local image capture module 1751 to store frames in section 1756 of the composite image buffer 1755. These stored frames are the images of the video-conference participant who is using the focus-point computer during the video conference. These images are captured by the camera 1750 and the local image capture module 1751 at the focus-point computer. In some embodiments, the frame rate controller 1752 changes the particular frame rate during a video conference, as the conditions of the video conference change.

As mentioned above, the resizers 1747-1749 retrieve frames from the buffers 1735-1745 based on the frame rate they receive from the controller 1752. Before storing a retrieved frame in the composite image buffer, a resizer resizes the retrieved frame when the non-focus computer that supplied this frame supplied it at a different size than the size of the composite-buffer section for this frame. For instance, to save bandwidth or computational resources during the encoding, a non-focus computer might encode and transmit smaller frames (i.e., encode frames at coarser level of granularity and transmit packets with less encoded content for each frame).

The focus computer 1505 defines the resizing operation for a particular non-focus participant during the set up process when the particular non-focus participant joins the conference. The focus computer 1505 might subsequently change or modify this resizing operation as a result of subsequent in-call adjustment operations.

As mentioned above, the resizers 1747-1749 store potentially-resized frames in their corresponding sections 1757-1759 of the composite image buffer 1755. In some embodiments, the composite image buffer 1755 is a location in the memory of the focus-point computer, and each section 1756-1759 in this buffer is a contiguous logical section at this location in the memory.

At the sampling rate that the controller 1752 defines, the encoder 1760 encodes the composite frame that is stored in the composite image buffer. The encoder encodes the sub-frame that is stored in each section 1756, 1757, 1758, or 1759 independently of the sub-frames that are stored in the other sections of the composite image buffer 1755. The encoder 1760 decouples the encoding of each sub-frame in each section 1756, 1757, 1758, or 1759 so that the encoding of each sub-frame does not depend on any other sub-frame (i.e., the encoding of one section does not use video data beyond the boundaries of each section). For example, the encoding of the macroblocks in the sub-frame of participant A in section 1757 does not depend on the encoding of the macroblocks in the sub-frame of participant B in the section 1758.

The focus computer 1505 defines the encoder 1760 during the set up process when a video conference commences. The focus computer 1505 might subsequently change or modify this encoder as a result of subsequent in-call adjustment operations.

After encoding a composite frame, the encoder 1760 supplies the redundancy remover with an encoded video stream that contains each participant's encoded video data in a separate section (i.e., contains different participants encoded video data in separate, non-interleaved sections). The non-interleaved structure of the encoded stream allows the redundancy remover to remove quickly a particular non-focus participant's video data from the video stream that is to be transmitted to the particular non-focus participant.

Once the redundancy remover removes each participant's redundant image data from the participant's video stream, the redundancy remover transmits the participant's video stream to the participant. Accordingly, FIG. 17 illustrates the redundancy remover 1765 sending three video streams to the three non-focus participants A, B, and C.

FIG. 17 also illustrates that the perspective adjuster 1775 of the focus-point module retrieves the focus point participant's image from focus point sub image 1756 in the composite image buffer 1755. The perspective adjuster 1775 also retrieves non-focus participants sub images from the intermediate buffers 1735, 1740, and 1745. In some embodiments, this adjuster receives these frames at the frame rate specified by the frame rate controller 1752. The adjuster 1775 adjusts each non-focus participant's frame for a perspective view on the display 1795 of the focus-point computer. It then supplies the adjusted frames to the local image controller, which then renders the frames for display on the display device 1795.

FIG. 17 provides a simplified conceptual illustration of the focus-point module's decoding and encoding operations.

One of ordinary skill will realize that the non-focus point module will have other components in other embodiments. For instance, in some embodiments, this module will have one or more modules to prevent duplicate encoding and/or decoding of an identical frame or very similar frames. These additional modules are further described in the above-incorporated U.S. patent application entitled "Video Processing in a Multi-Participant Video Conference".

C. Non-Focus Point Module's Video Codec Section

Figure 18:
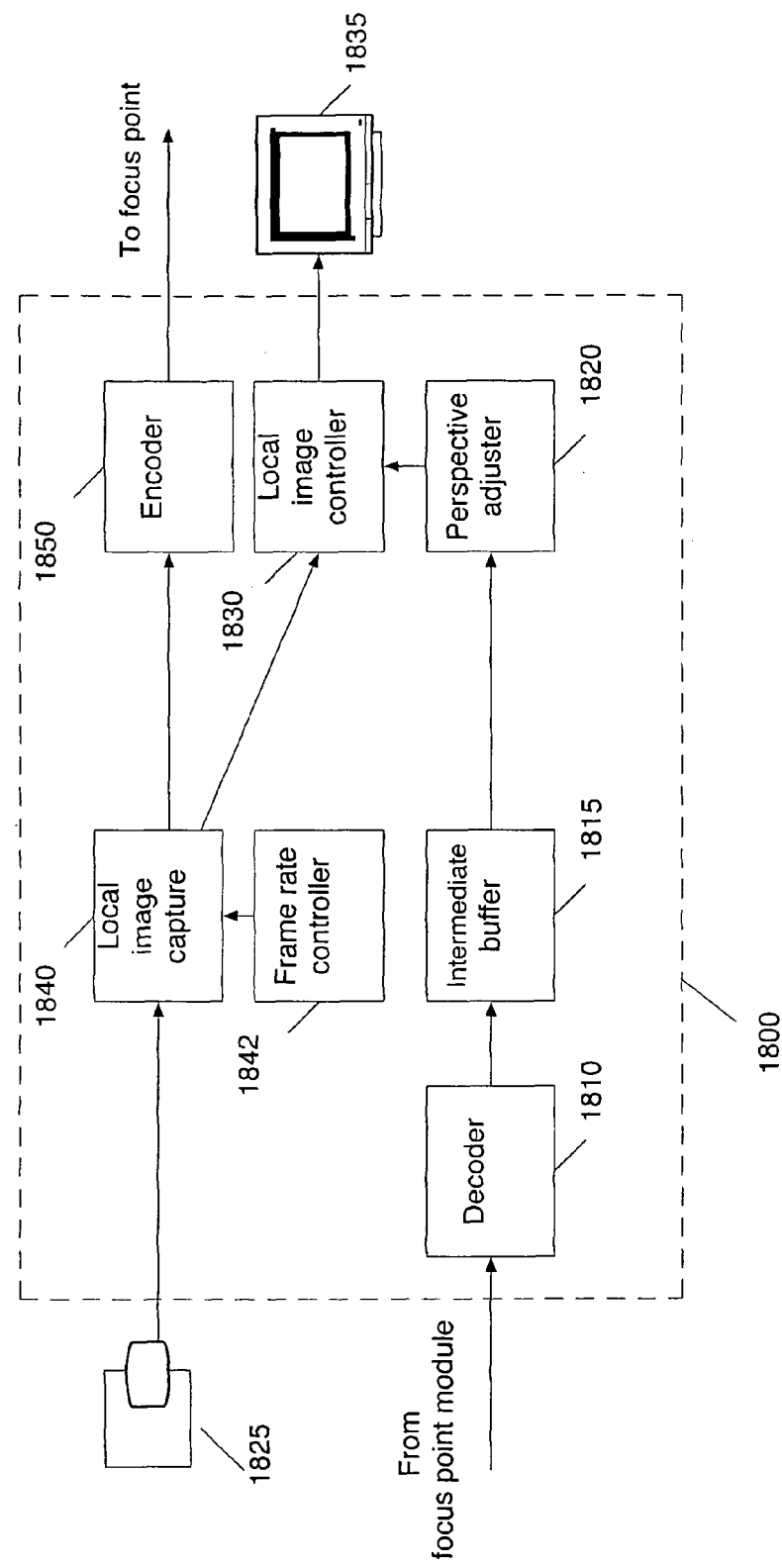
FIG. 18 illustrates a non focus video codec section of a non focus point module of a non focus computer.

For some embodiments of the invention, FIG. 18 illustrates a non-focus video codec section 1800 of a non-focus point module of a non-focus computer 1510, 1515, or 1520. The video codec section 1800 performs encoding and decoding operations. For its encoding operation, the video codec section 1800 utilizes a local image capture module 1840, a frame rate controller 1842, and an encoder 1850. For its decoding operation, the video codec section 1800 utilizes a decoder 1810, an intermediate buffer 1815, a perspective adjuster 1820, and a local image controller 1830.

During the video conference, a camera 1825 attached to the non-focus computer films the video-conference participant who is using the non-focus point computer. During the encoding operation, the local image capture module 1840 receives and captures video frames that are produced by the camera. At a particular sampling rate that is specified by the frame rate controller 1842, the local image capture module 1840 directs the captured frames to the encoder 1850, which then encodes and transmits the frames to focus-point computer. In some embodiments, the encoder 1840 and the frame rate of the controller 1842 are defined during the setup process for the non-focus computer, and are susceptible to changes through in-call adjustments during the video conference as the conference conditions change.

During its decoding operation, the video codec section 1800 receives composite frames from the focus point module and decodes them for display on the display device 1835 of the non-focus computer. Specifically, the decoding process when the video codec section 1800 receives a video stream that contains a composite frame from the focus point module. Next, the decoder 1810 decodes the received composite frame, and stores the decoded composite frame in the intermediate buffer. In some embodiments, the decoder 1810 is defined during the setup process for the non-focus computer, but might change through in-call adjustments during the video conference as the conference conditions change.

Each decoded composite frame includes several sub-frames, where each sub-frame represents a frame of one of the other participants in the video conference. The perspective adjuster 1820 then retrieves the decoded sub-frames from the intermediate buffer, and adjusts the perspective view of these images of the other conference participant. The adjuster 1820 supplies the adjusted frames to the local image controller 1830. The local image controller also receives a video frame of the local non-focus point video-conference participant from the local image capture 1840. From the adjusted frames of the other conference participants and the local participant's captured frame, the local image controller 1830 then renders the video-conference display presentation for display on the display device 1835 of the non-focus computer.

FIG. 18 provides a simplified conceptual illustration of the non-focus point module's decoding and encoding operations. One of ordinary skill will realize that the non-focus point module will have other components in other embodiments. For instance, in some embodiments, this module will have one or more modules to prevent duplicate encoding and/or decoding of an identical frame or very similar frames. These additional modules are further described in the above-incorporated U.S. patent application entitled "Video Processing in a Multi-Participant Video Conference".

D. Focus-Point Module's Audio Codec Section

Figure 19:
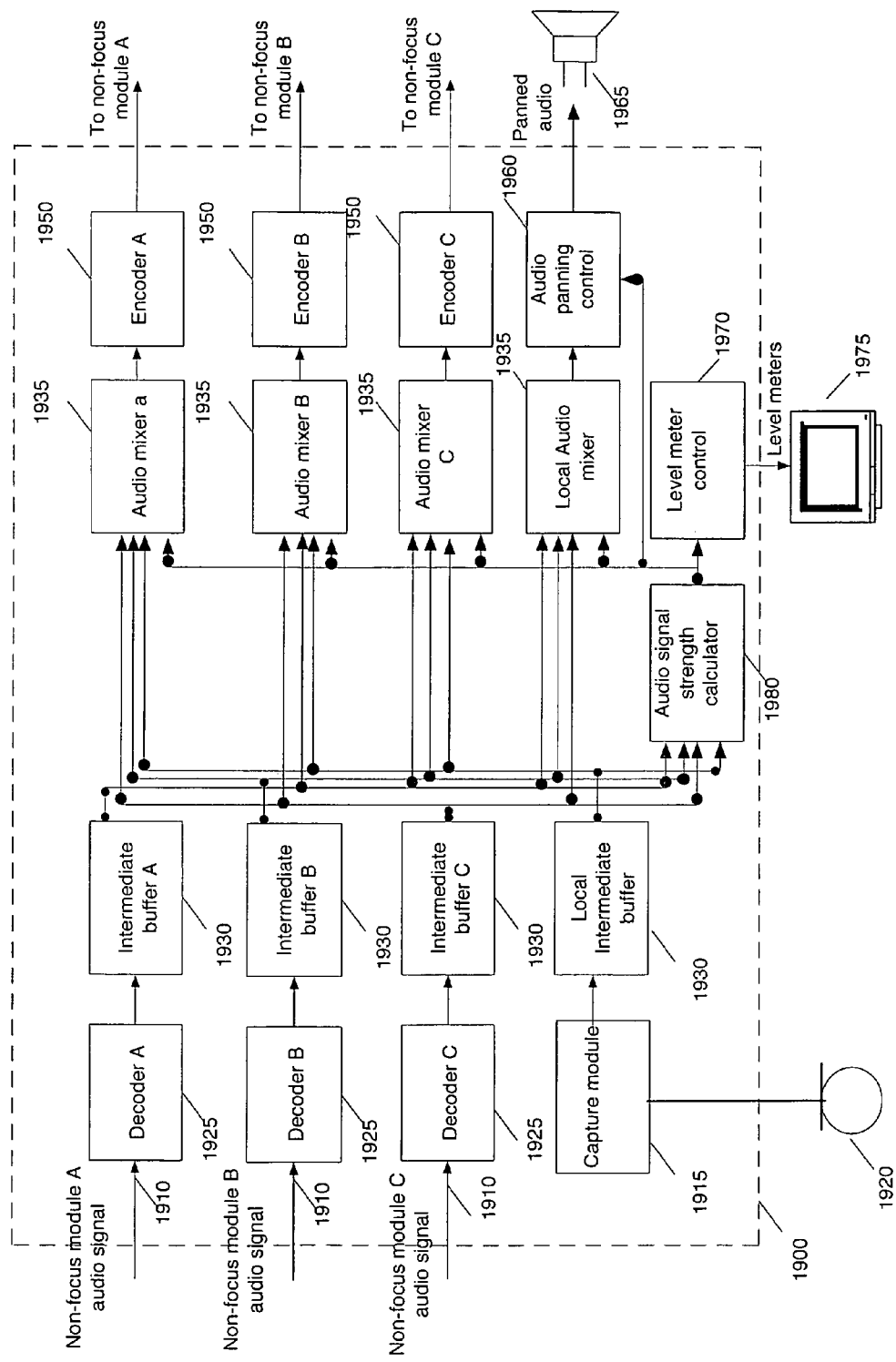
FIG. 19 illustrates an audio codec section of the focus point module of the focus computer.

For some embodiments of the invention, FIG. 19 illustrates an audio codec section 1900 of the focus-point module of the focus computer 1505. The focus audio codec 1900 generates mixed audio signals for transmitting to non-focus participants, and performs audio presentation for the conference participant who is using the focus point computer during the video conference.

For its audio mixing operation, the focus audio codec 1900 utilizes one decoder 1925 and one intermediate buffer 1930 for each incoming audio signal, an intermediate buffer 1930 for the focus point audio signal, one audio capture module 1915, one signal strength calculator 1980, one audio mixer 1935 for each mixed audio signal, and one encoder 1950 for each transmitted mixed audio signal. For its audio presentation operation at the focus-point computer, the focus audio codec 1900 also utilizes one audio panning control 1960 and one level meter control 1970.

During its audio mixing operation, two or more decoders 1925 receive two or more audio signals 1910 containing digital audio samples from two or more non-focus point modules. The decoders 1925 decode and store the decoded audio signals in two or more intermediate buffers 1930. In some embodiments, the decoder 1925 for each non-focus computer's audio stream uses a decoding algorithm that is appropriate for the audio codec used by the non-focus computer. This decoder is specified during the process that sets up the audio/video conference. The decoder for each stream might change during a video conference as a result of in-call adjustment operations.

The focus audio codec 1900 also captures audio from the participant that is using the focus point computer, through microphone 1920 and the audio capture module 1915. The focus audio codec stores the captured audio signal from the focus-point participant in its corresponding intermediate buffer 1930.

Next, the audio signal strength calculator 1980 calculates signal strength indicia corresponding to the strength of each received signal. Audio signal strength calculator 1980 assigns a weight to each signal. In some embodiments, the audio signal strength calculator 1980 calculates the signal strength indicia as the Root Mean Square (RMS) power of the audio stream coming from the participant to the focus point. The RMS power is calculated from the following formula:

$$\text{RMS} = \sqrt{\frac{\sum_{i=1}^{N}(Sample_i)^2}{N}},$$

where N is the number of samples used to calculate the RMS power and $Sample_i$ is the $i^{th}$ sample's amplitude. The number of samples, N, that audio signal strength calculator 1980 uses to calculate RMS value depends on the sampling rate of the signal. For example, in some embodiments of the invention where the sampling rate is 8 KHz, the RMS power might be calculated using a 20 ms chunk of audio data containing 160 samples. Other sampling rates may require a different number of samples.

The audio codec 1900 then utilizes the audio mixers 1935 to mix the buffered audio signals. Each audio mixer 1935 generates mixed audio signals for one of the participants. The mixed audio signal for each particular participant includes all participants' audio signals except the particular participant's audio signal. Eliminating a particular participant's audio signal from the mix that the particular participant receives eliminates echo when the mixed audio is played on the participant computer's loudspeakers.

The mixers 1935 mix the audio signals by generating a weighted sum of these signals. To obtain an audio sample value at a particular sample time in a mixed audio signal, all samples at the particular sampling time are added based on the weight values computed by the audio signal strength calculator 1980. In some embodiments, the weights are dynamically determined based on the calculated signal strength indicia to achieve certain objectives. Example of such objectives include (1) the elimination of weaker signals, which are typically attributable to noise, and (2) the prevention of one participant's audio signal from overpowering other participants' signals, which often results when one participant consistently speaks louder than the other or has better audio equipment than the other. In some embodiments, the mixers 1935 append the signal strength indicia of all audio signals that were summed up to generate the mixed signal.

Next, for the non-focus computers' audio, the encoders 1950 encode the mixed audio signals and send them to their corresponding non-focus modules. Each particular encoder is specified during the process that added the non-focus computer corresponding to the particular encoder to the video conference. The encoder for each stream might change during a video conference as a result of in-call adjustment operations.

The mixed audio signal for the focus point computer is sent unencoded to focus point audio panning control 1960. Also, the signal strength indicia is sent to the level meter 1970 of the focus audio codec, which then generates the appropriate volume level indicators for display on the display device 1975 of the focus point computer.

One of ordinary skill will realize that other embodiments might implement the focus point module differently. For instance, in some embodiments, the focus point produces a single mixed signal that includes every participant's audio. This stream along with signal strength indicia is sent to every participant. When playing this stream, a participant will mute playback if that same participant is the primary contributor. This scheme saves focus point computing time and provides echo suppression without requiring separate, distinct streams for each participant. Also, during IP multicast, the focus point stream bandwidth can be reduced. In these embodiments, the focus point has one audio mixer and one encoder.

E. Non Focus Point Module's Audio Codec Section

Figure 20:
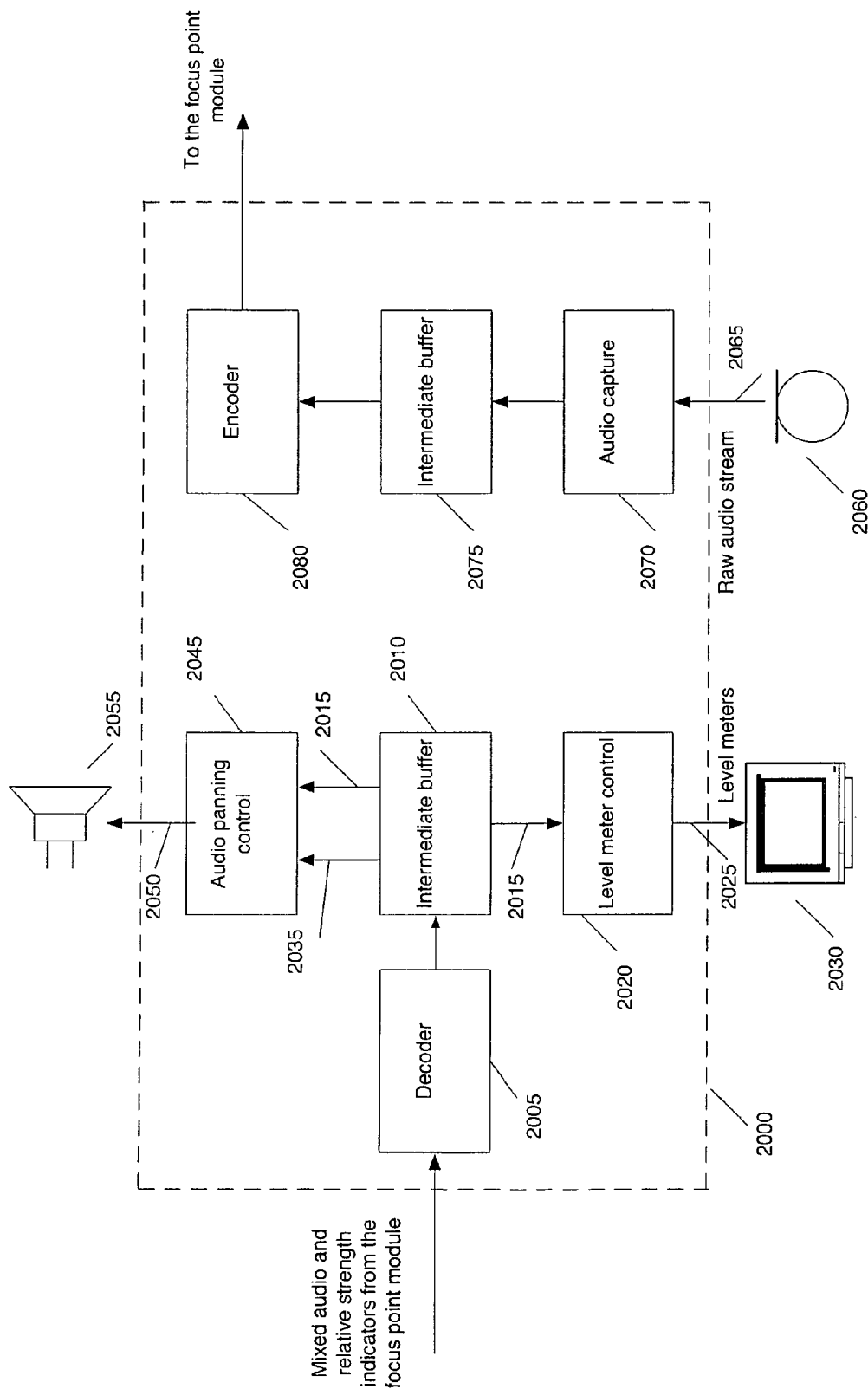
FIG. 20 illustrates a non focus audio codec section of a non focus point module of a non focus computer.

For some embodiments of the invention, FIG. 20 illustrates a non-focus audio codec section 2000 of a non-focus point module of a non-focus computer 1510, 1515, or 1520. In this example, the non-focus audio codec 2000 utilizes a decoder 2005, two intermediate buffers 2010 and 2075, a level meter control 2020, an audio panning control 2045, an audio capture module 2070, and an encoder 2080.

The non-focus audio codec performs encoding and decoding operations. During the encoding operation, the audio signal of the non-focus point participant's microphone 2060 is captured by audio capture module 2070 and is stored in its corresponding intermediate buffer 2075. The encoder 2080 then encodes the contents of the intermediate buffer 2075 and sends it to the focus point module. The encoder 2080 is specified during the process that added the non-focus computer to the particular conference. The encoder 2080 might be changed or modified during a video conference as a result of in-call adjustment operations.

The decoding operation, of the non-focus audio codec 2000 starts when the decoder 2005 receives audio packets from the focus point module. The decoder 2005 decodes each received audio packet to obtain mixed audio data and the signal strength indicia associated with the audio data. Like the encoder 2080, the decoder 2005 is specified during the process that added the non-focus computer to the particular conference. The decoder 2005 might be changed or modified during a video conference as a result of in-call adjustment operations.

The decoder 2005 saves the decoded mixed audio data and associated signal strength indicia in the intermediate buffer 2010. The signal strength indicia are sent to level meter control 2020 to display the audio level meters on the non-focus participant's display 2030. In a multi-participant audio/video conference, it is desirable to identify active speakers. One novel feature of the current invention is to represent the audio strengths by displaying audio level meters corresponding to each speaker's voice strength. Level meters displayed on each participant's screen express the volume level of the different participants while the mixed audio signal is being heard from the loud speakers 2055. Each participant's volume level can be represented by a separate level meter, thereby, allowing the viewer to know the active speakers and the audio level from each participant at any time.

The decoded mixed audio signal and signal strength indicia stored in the intermediate buffer 2010 are also sent to the audio panning control 2045 to control the non-focus participant's loudspeakers 2055. Audio panning helps identify the location of the currently speaking participants on the screen and produces stereo accounting for location. Some embodiments achieve audio panning through a combination of signal delay and signal amplitude adjustment. For instance, when the participant whose image is placed on the left side of the screen speaks, the audio coming from the right speaker is changed by a combination of introducing a delay and adjusting the amplitude to make the feeling that the voice is coming from the left speaker.

The audio and video codec operations of the focus and non-focus modules are further described in the above-incorporated patent applications.

V. Heterogeneous Multi-Participant Video Conference

The above described focus-point architecture can seamlessly support heterogeneous multi-participant conferencing, where different conferencing computers participate differently in the conference. For instance, some embodiments allow different non-focus computers to use different audio encoders 2080. To facilitate such a difference, the focus-point computer 1505 would use different audio decoders 1910 for the different audio encoders 2080 of the non-focus computers.

Similarly, some embodiments allow different non-focus computers to use different video encoders 1850. To facilitate such a difference, the focus-point computer 1505 would use different video decoders 1720-1730 for the different encoders 1850 of the non-focus computers. Some embodiments also allow different non-focus computers to provide different sized frames, by allowing the resizers 1747-1749 of the focus computer to resize differently the different sized frames of the non-focus computers.

Figure 21:
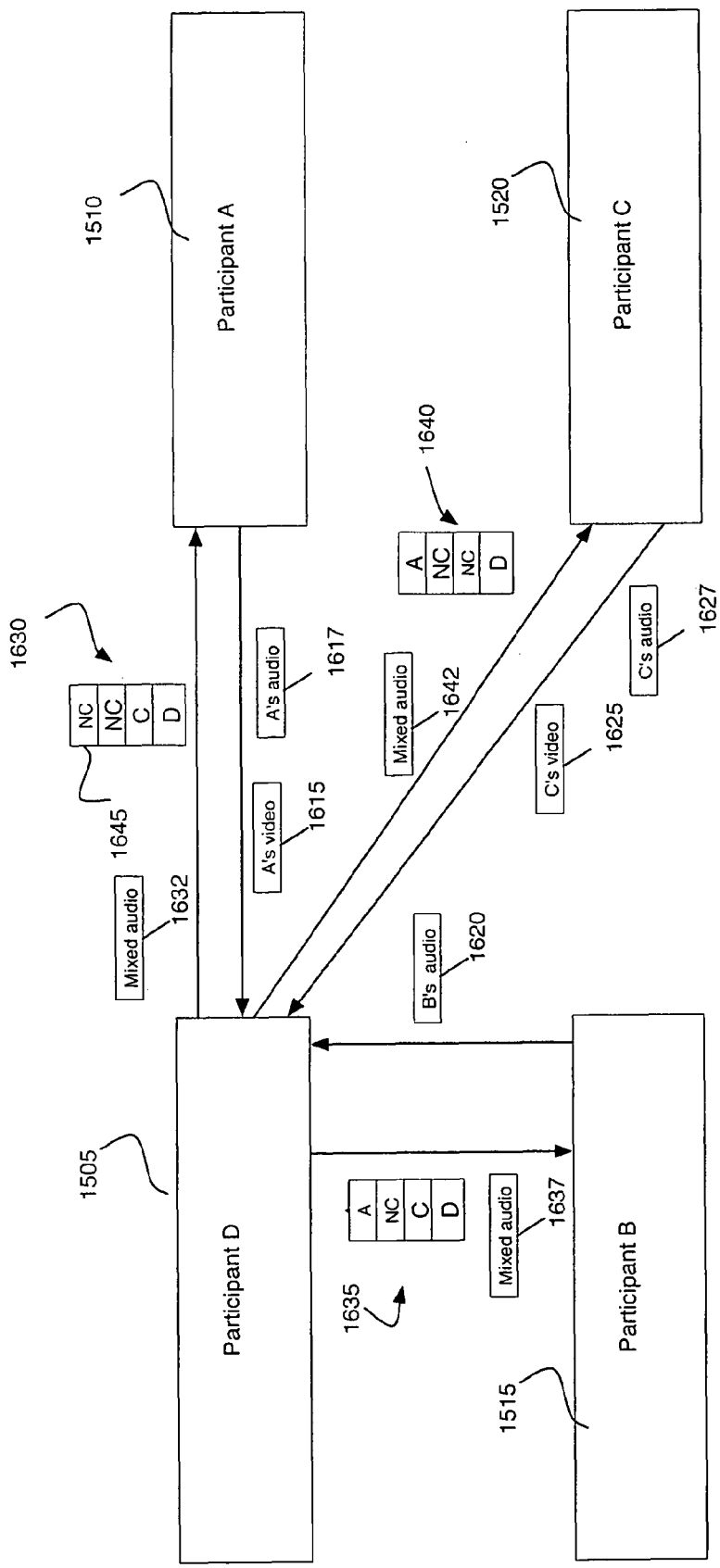
FIG. 21 illustrates an example where a participant does not provide any video data to a focus computer.

Moreover, in some embodiments, a participant might not provide any video data to the focus computer. FIG. 21 illustrates an example of such a situation. In this example, the conference includes four participants A, B, C, and D, with the participant D's computer serving as the focus point and the participant B's computer providing only audio data.

Figure 22:
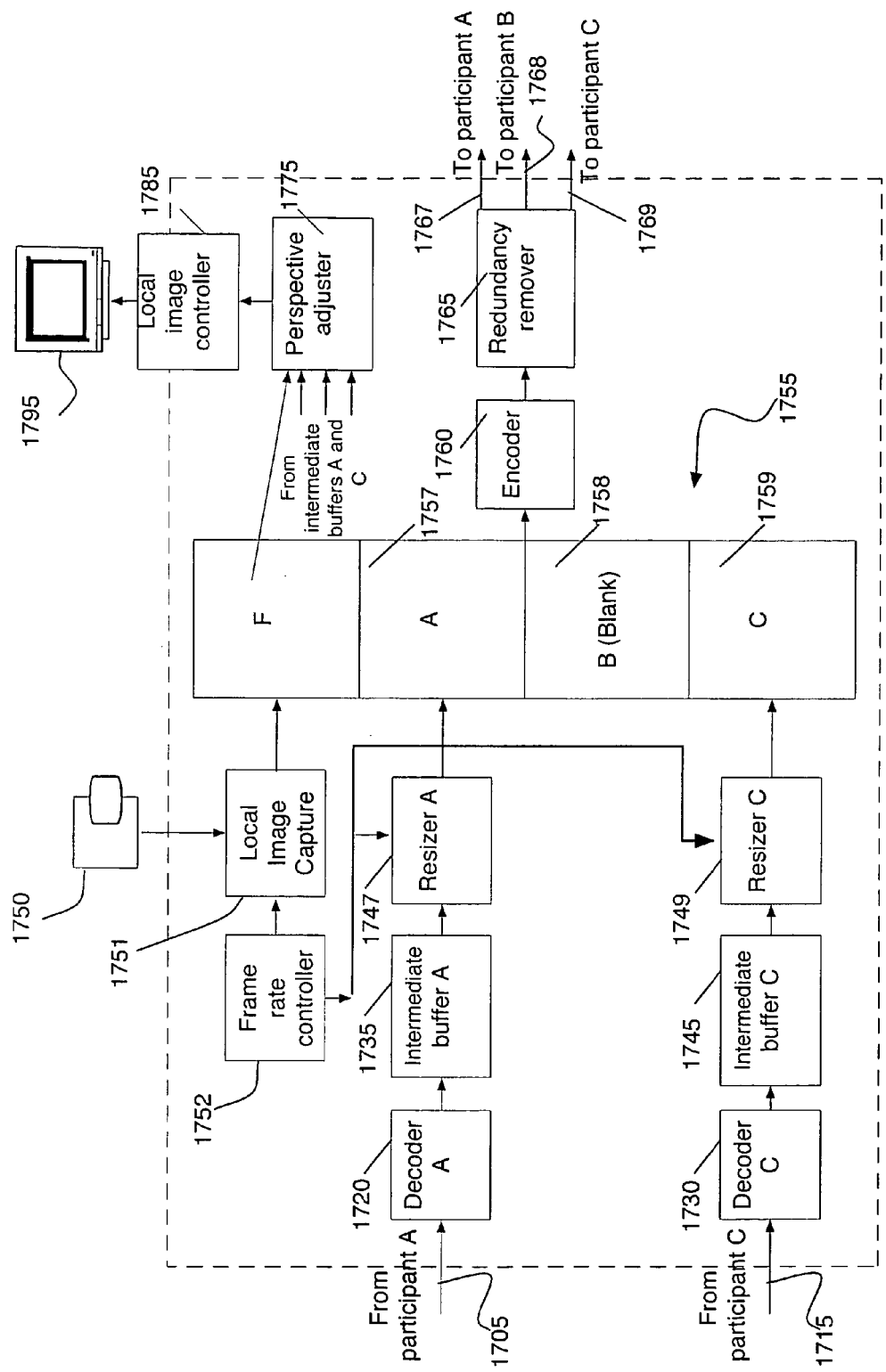
FIG. 22 illustrates an example of a focus point video codec.

In this example, all that the focus computer 1505 would have to do would be to forego defining in its video codec a video-decoding pipeline for the participant B. FIG. 22 illustrates an example of such a focus point video codec 2200. As shown in FIG. 22, the focus point video codec 2200 includes only two video-decoding pipelines, one for the participant A and one for participant C. For the participant B's image in the composite image, the codec 2200 stores a blank image in some embodiments. In other embodiments, the codec 2200 would not even define a section in the composite image buffer 1755 for the participant B. In either approach, the composite frames that are sent to the non-focus participants will not contain any video data regarding participant B. Accordingly, no participant will show any video of participant B.

However, given that in this example participant B is still providing audio data, the focus point uses the audio codec 1900 of FIG. 19, which has an audio decoder 1925, an intermediate audio buffer 1930, an audio mixer 1935, and an audio encoder 1950 for the participant B. These components decode the participant B's audio data, store this data, mix this data with the audio data of the other participants, and then encode and transmit the mixed data to other participants.

Figure 23:
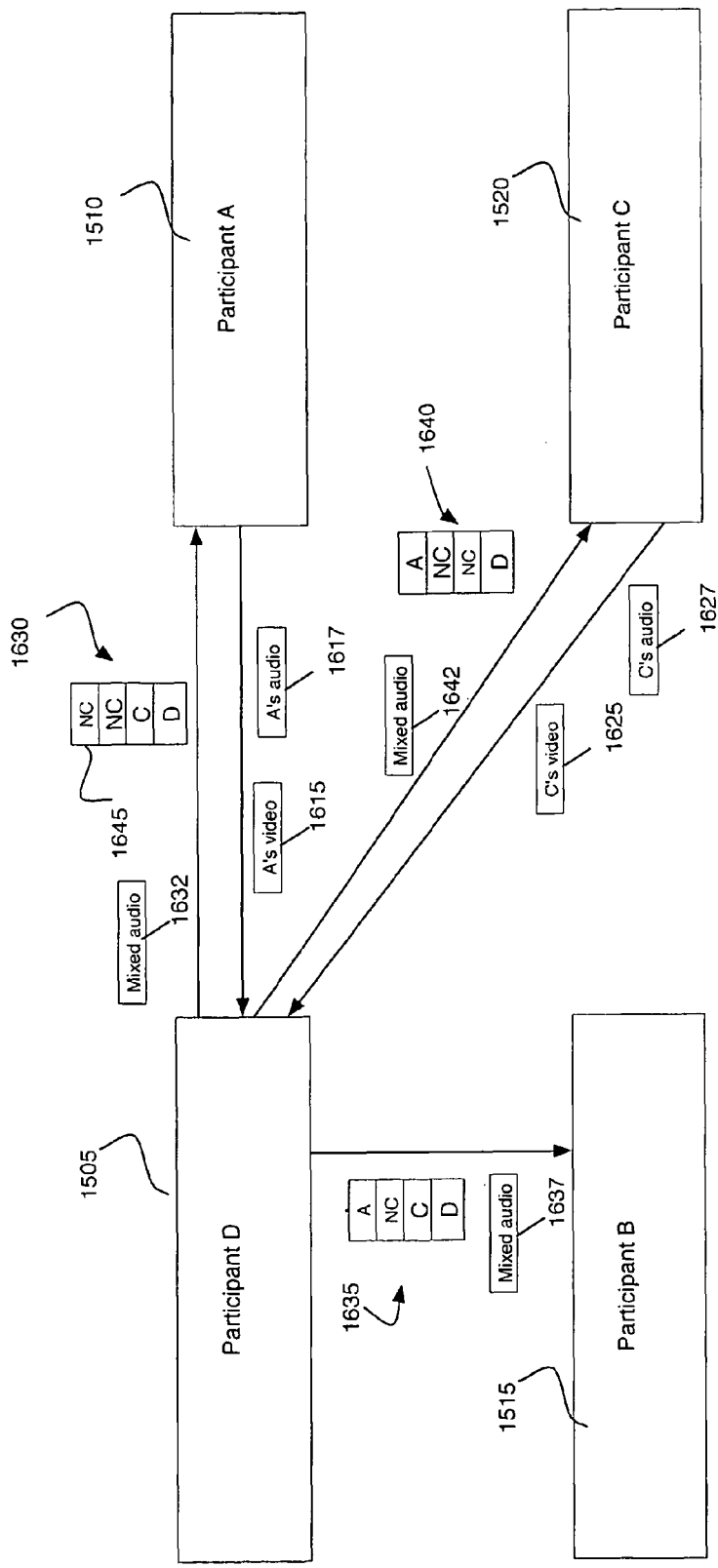
FIG. 23 illustrates an example where a participant does not provide any audio or video data to a focus computer.

In some embodiments, a participant might not provide any audio or video data to the focus computer. FIG. 23 illustrates an example of such a situation. In this example, the conference includes four participants A, B, C, and D, with the participant D's computer serving as the focus point and the participant B's computer providing no audio or video data.

Figure 24:
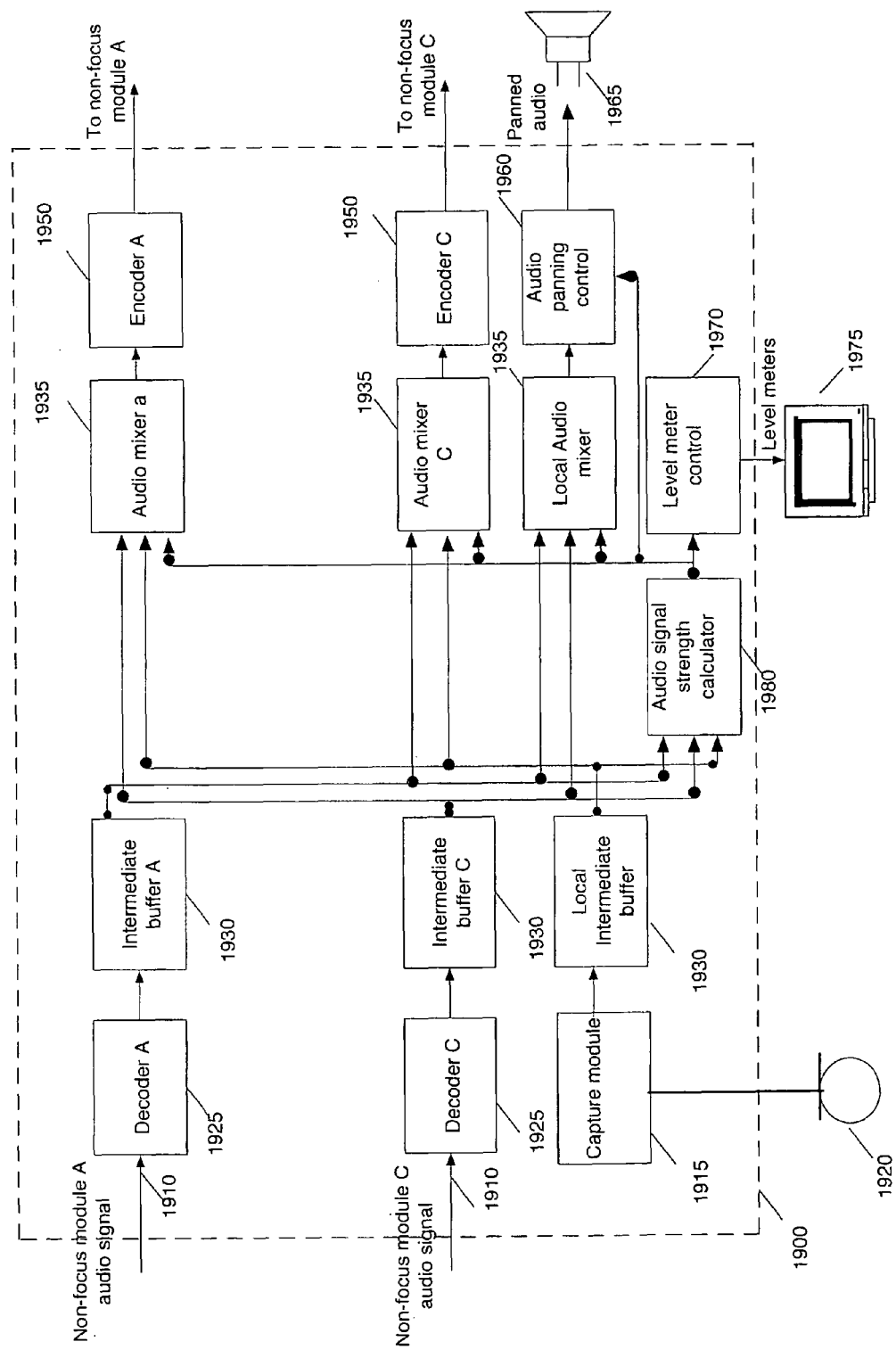
FIG. 24 illustrates an example of a focus point audio codec.

In this example, the focus computer 1505 would not only forego defining in its video codec a video-decoding pipeline for the participant B, but also would forego defining, in its audio codec, audio decoding and mixing pipelines for the participant B. FIG. 24 illustrates an example of such a focus point audio codec 2400. As shown in FIG. 24, the focus point audio codec 2400 includes only two audio-decoding pipelines, one for the participant A and one for participant C. Also, the focus point audio codec 2400 includes only three audio mixers, one for the participant A, one for participant C, and one for the participant D.

The foregoing has described methods and apparatus for multi-participant conferencing. One of ordinary skill will also recognize that the invention can be embodied in other specific forms without departing from the spirit of the invention, even though the invention has been described with reference to numerous specific details. For instance, even through the embodiments described above perform the focus point designation before the set up of the video conference, other embodiments designate a focus point computer during the video conference set up. In view of the foregoing, one of ordinary skill in the art would understand that the invention is not to be limited by the foregoing illustrative details, but rather is to be defined by the appended claims.

We claim:

1. A method of establishing a conference through a plurality of computing devices, the method comprising:
   performing a focus-point assessment, including determining that a first computing device meets predefined conferencing capabilities;
   designating the first computing device as a focus point computing device for said conference based at least in part on the focus-point assessment;
   designating one or more computing devices computers of the plurality of computing devices as non-focus point computing devices; and
   receiving, from at least one of the non-focus point computing devices, audio or video signals at the focus point computing device and distributing the received signals to at least another one of the non-focus point computing devices.

2. The method of claim 1, wherein the designation is performed before setting up of said conference.

3. The method of claim 1, wherein the designation is performed during setting up of said conference.

4. The method of claim 1, wherein the set of criteria includes a set of hardware criteria relating to hardware components of the focus-point computing device.

5. The method of claim 1, wherein the computing devices are interconnected through a network, wherein the set of criteria includes criteria relating to an estimated network bandwidth of the focus-point computing device.

6. The method of claim 5 further comprising using a remote bandwidth server to obtain said estimated network bandwidth.

7. The method of claim 1, wherein the set of criteria are used to determine a set of default parameters for said conference.

8. The method of claim 7, said set of default parameters comprising at least one of a bit rate parameter, an encoding codec parameter, or a video-image size parameter.

9. The method of claim 1 further comprising:
   setting up a conference between two computing devices; and
   inviting a third computing device to join the conference.

10. The method of claim 9, wherein said invitation is sent by using a Session Initiation Protocol.

11. The method of claim 10, wherein said invitation comprises an encryption parameter, said encryption parameter for indicating the encryption capability of said focus point computing device.

12. The method of claim 10, wherein said audio or video signals are encrypted.

13. A non-transitory computer readable medium comprising a computer program for establishing a conference through a plurality of computing devices, said computer program having sets of instructions for:
   performing a focus-point assessment, including determining that a first computing device meets predefined conferencing capabilities;
   designating the first computing device as a focus point computing device for said conference based on at least in part the focus-point assessment;
   designating one or more computing devices of the plurality of computing devices as non-focus point computing devices; and
   receiving, from at least one of the non-focus point computing devices, audio or video signals at the focus point computing device and distributing the received signals to at least another one of the non-focus point computing devices.

14. The computer readable medium of claim 13, wherein said focus point designation is performed before setting up of said conference.

15. The computer readable medium of claim 13, wherein said focus point designation is performed during setting up of said conference.

16. The computer readable medium of claim 13, wherein the set of criteria includes a set of hardware criteria relating to hardware components of the focus-point computing device.

17. The computer readable medium of claim 13, wherein the computing devices are interconnected through a network, wherein the set of criteria includes a set of criteria relating to an estimated network bandwidth of the focus-point computing device.

18. The computer readable medium of claim 17 further comprising using a remote bandwidth server to obtain said estimated bandwidth.

19. The computer readable medium of claim 13, wherein the set of criteria are used to determine a set of default parameters for said conference.

20. The computer readable medium of claim 19, said set of default parameters comprising at least one of a bit rate parameter, an encoding codec parameter, or a video-image size parameter.

* * * * *